United States Patent
Sit et al.

(10) Patent No.: US 6,907,230 B2
(45) Date of Patent: Jun. 14, 2005

(54) TELECOMMUNICATIONS CHASSIS, MODULE, AND BRIDGING REPEATER CIRCUITRY

(75) Inventors: Eric Sit, Eden Prairie, MN (US); Robin Berg, Jr., Shakopee, MN (US); Brian McClellan, Richfield, MN (US); Steven Skradde, Lino Lakes, MN (US); David Streitz, Burnsville, MN (US); John Anderson, Eden Prairie, MN (US); Gary L. Steinkogler, Eagan, MN (US); Eric Comer, Fridley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 720 days.

(21) Appl. No.: 09/812,226

(22) Filed: Mar. 19, 2001

(65) Prior Publication Data

US 2002/0132576 A1 Sep. 19, 2002

(51) Int. Cl.⁷ .................................................. H04B 1/38
(52) U.S. Cl. ...................................... 455/90.3; 439/64
(58) Field of Search ............................... 455/7, 9, 90.3, 455/347, 348, 349; 439/64, 347, 61

(56) References Cited

U.S. PATENT DOCUMENTS

| | | | | |
|---|---|---|---|---|
| 5,398,161 A | * | 3/1995 | Roy | 361/727 |
| 6,345,986 B1 | * | 2/2002 | Follingstad et al. | 439/64 |
| 6,483,029 B1 | * | 11/2002 | Lutz, Jr. | 174/50 |

OTHER PUBLICATIONS

*Schematics;* ADC Telecommunications, Jul. 1998, pp. 5–6.
PxPlus DS1 Digital Signal Cross–Connect; ADC, Jan. 1997, pp. 7–8.
*Mini DSX–3 Interbay Patch Panels*, ADC, Feb. 1997, p. 3.
Soneplex HDSL 239 Repeater, ADC Telecommunications, May 1998.
Soneplex HDSL Remote Enclosures, ADC Telecommunication, May 1998, pp. 1–5.
Soneplex HDSL 819 Repeater, ADC Telecommunications, May 1998.
Soneplex HDSL Remote Module, ADC Telecommunications, May 1998.
Soneplex T1 Repeater Module, ADC Telecommunications, May. 1998.
Soneplex E1 Quad Loop Extender Four–Position Remote Chassis, ADC, Sep. 1998, pp. 1–3.
E1 Dual Fiber Loop Converter System, ADC Telecommunications, May 1997, pp. 1–5.
Homeworx Access Platform Telephony System, ADC, Feb. 1996, pp. 5–6.

(Continued)

*Primary Examiner*—Vivian Chin
*Assistant Examiner*—Sanh Phu
(74) *Attorney, Agent, or Firm*—Merchant & Gould P.C.

(57) ABSTRACT

A telecommunications chassis, module, and repeater circuit for use with signals having data rates including STM-1 (155.52 megabits per second) are disclosed. The chassis provides structures for establishing shielding and heat dissipation for the circuitry modules it contains including an outer and an inner Faraday box with an integrated ventilation pattern for circulating air. The module provides its own structures for establishing shielding and heat dissipation including a Faraday box and a ventilation pattern. The repeater circuit provides the ability to bridge a data signal between a monitor jack of one device and a higher signal level input jack of another device through multiple amplification stages and circuit board structures. The telecommunications chassis, module, and repeater circuit can be used in conjunction.

14 Claims, 21 Drawing Sheets

OTHER PUBLICATIONS

HWX Receiver Modules, Forward Path and Dual Return Path Receivers, ADC Telecommunications, Dec. 1998, pp. 1–5.

DV6000, Intermediate Frequency (IF) Video Encoders and Decoders, ADC Telecommunications, Dec. 1998, pp. 1–3.

DV6000, DV6120 DS Dual Optical Switch, ADC Video Systems.

DV6000, Serial Digital Video (D1) Interface Cards, ADC Broadband Communications.

DV6000, Dense Wavelength Division Multiplexing, ADC Telecommunications, Jun. 1997, pp. 1–3.

DV6000, PAL IF Encoders and Decoders, ADC Telecommunications, Dec. 1998, pp. 1–3.

DV6000, MMDS Optimized Intermediate Frequency (IF) Encoders and Decoders, ADC Telecommunications, Dec. 1998, pp. 1–3.

Homeworks HWX Power Supply/Controller Module, ADC Broadband Communications.

Wideband, High Gain, Voltage Limiting Amplifier OPA 689, Burr–Brown, 1997, pp. 1–17.

Wideband, Low Power Current Feedback, Operational Amplifier OPA 658, Burr–Brown, 1994, pp. 1–13.

Telects DS3 Products, Telects's DS3 Broadband Portable Bridging Office Repeater, Telect, Sep. 6, 2000, pp. 44–45.

* cited by examiner

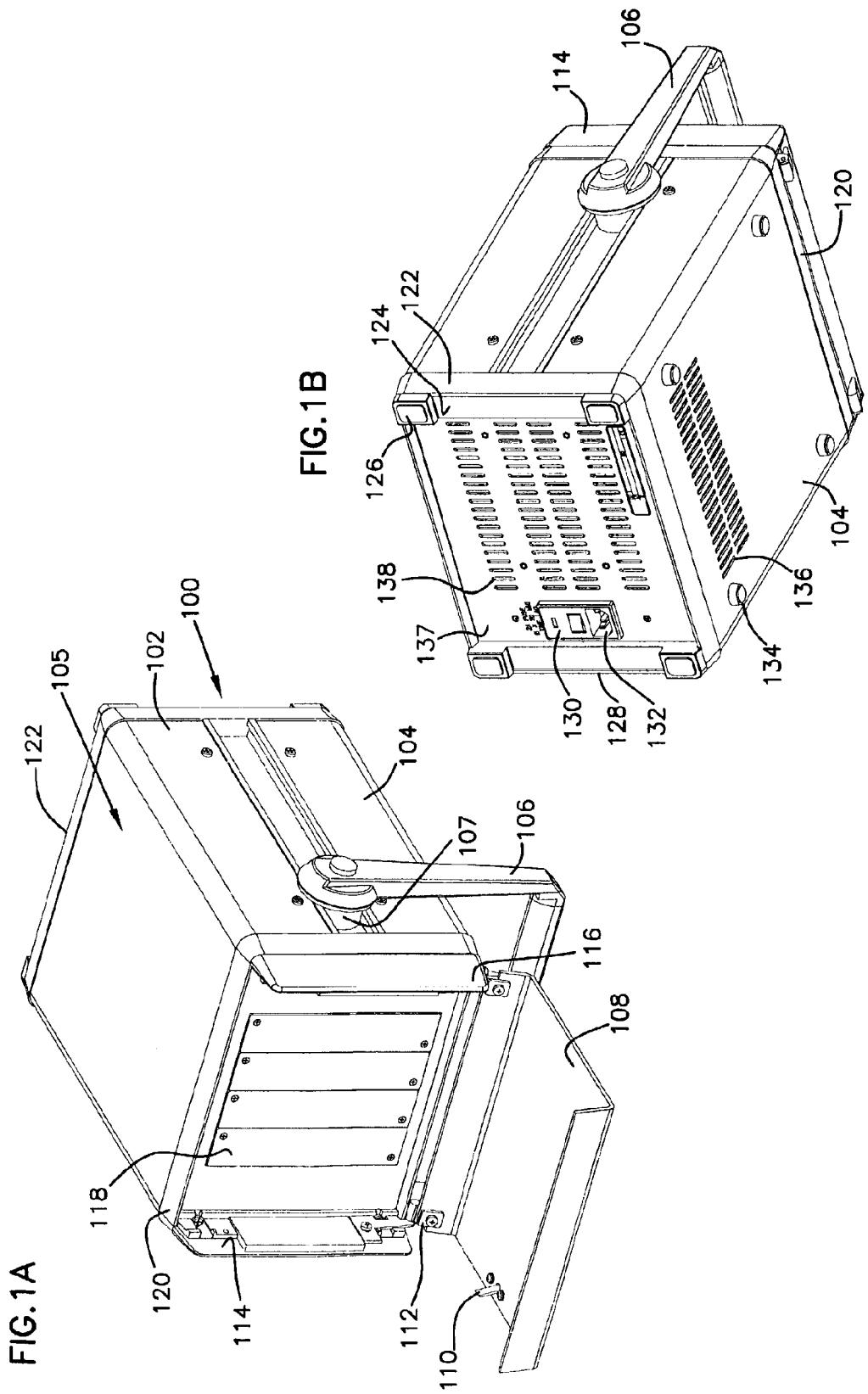

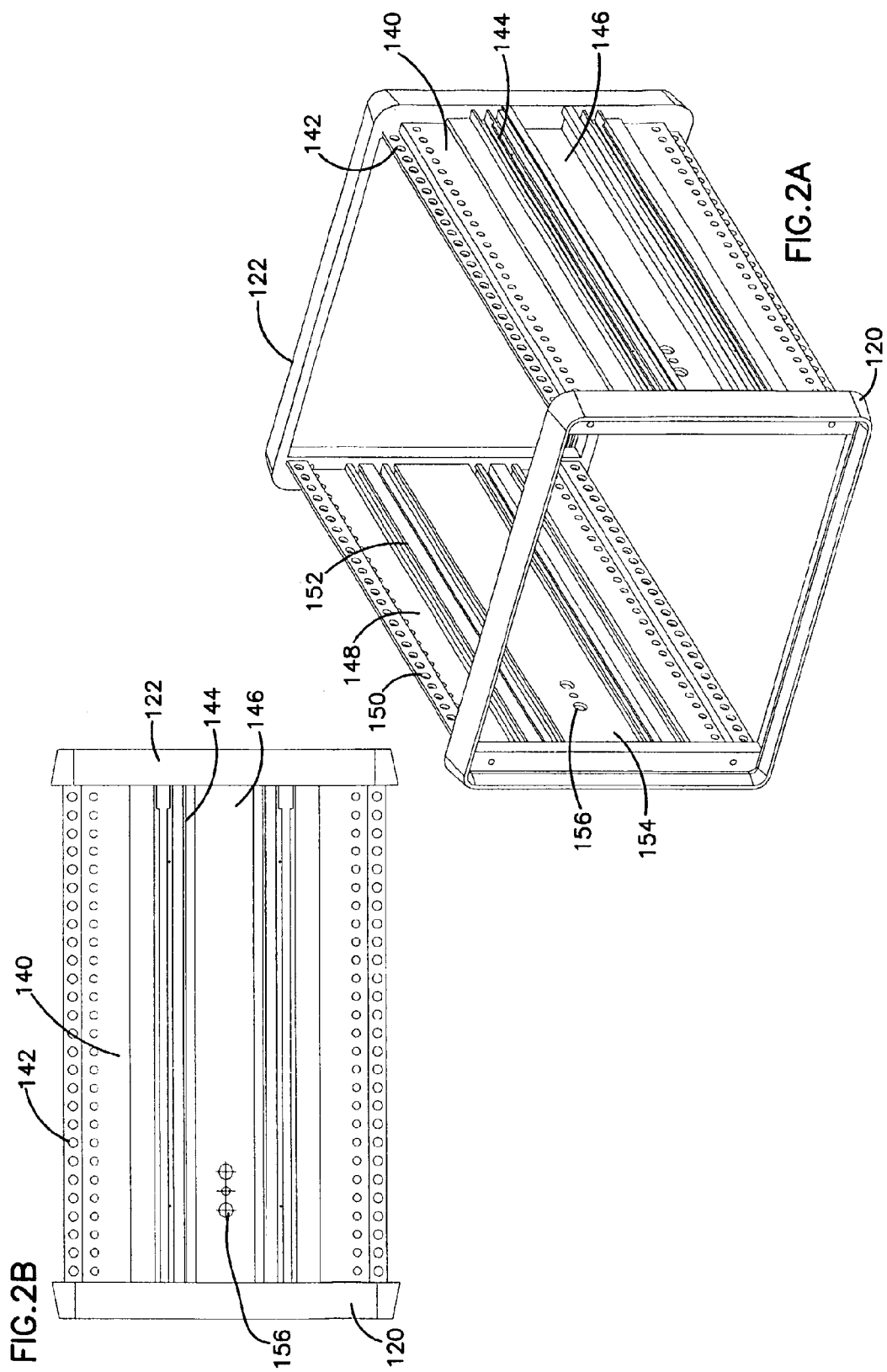

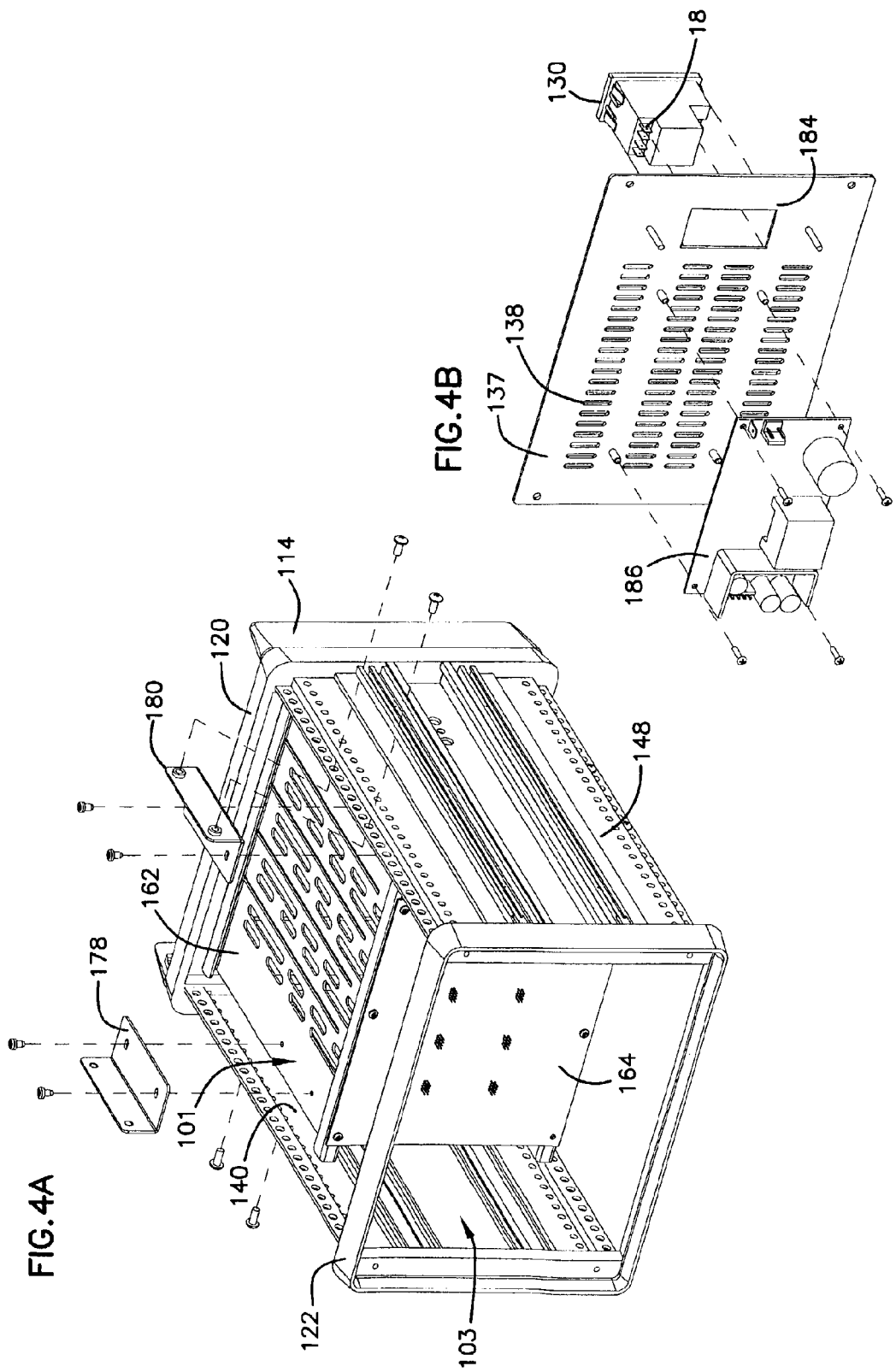

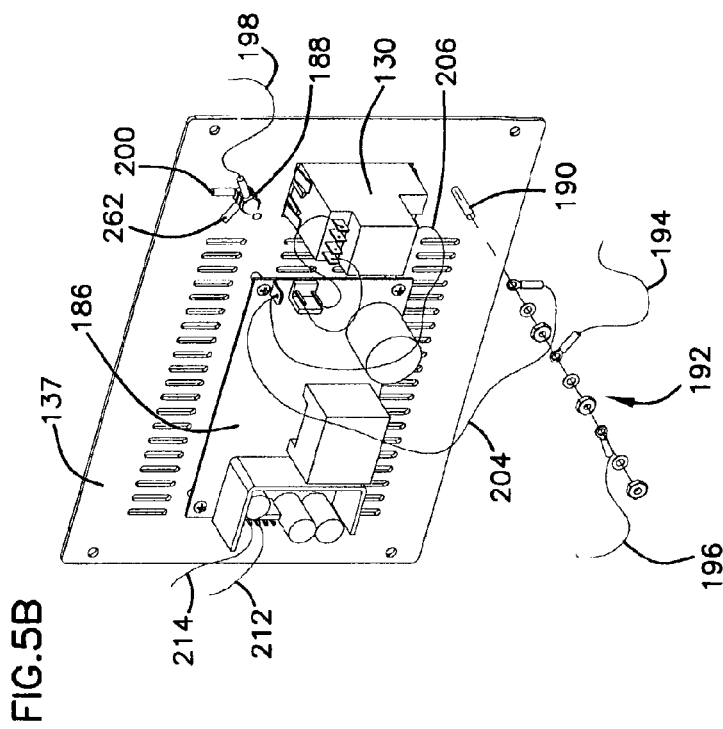
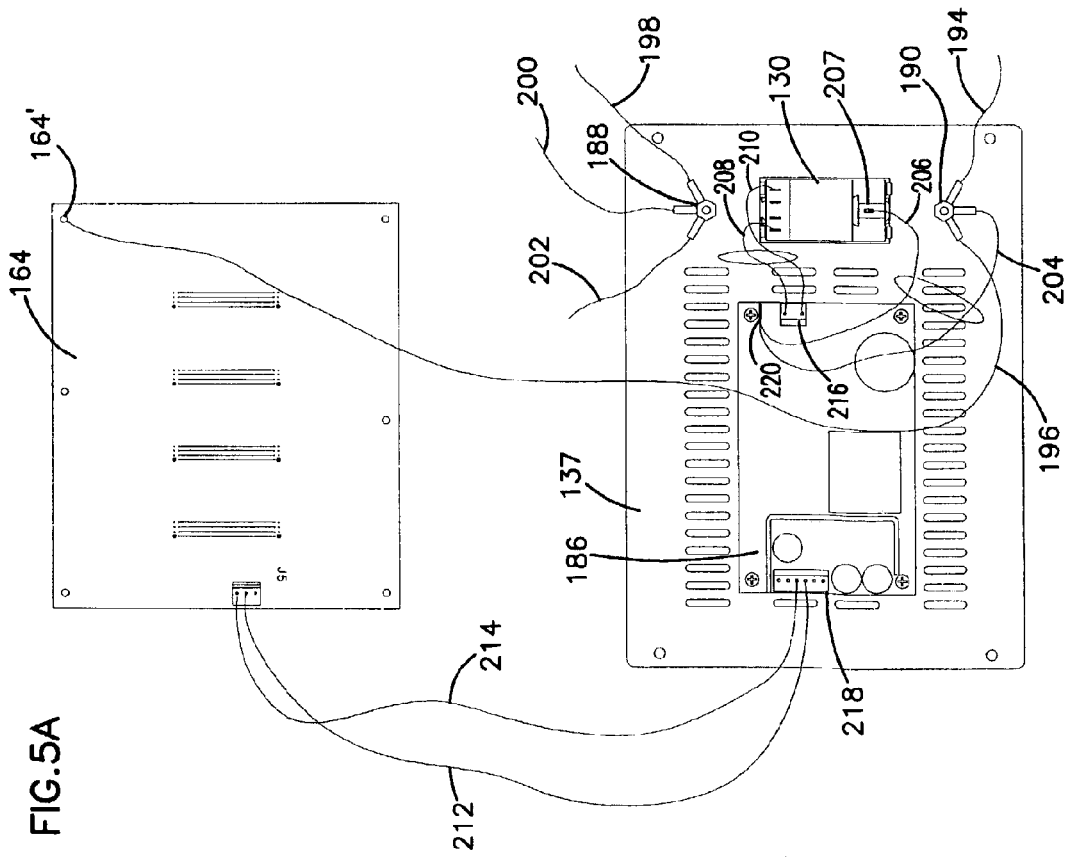
FIG.5B
FIG.5A

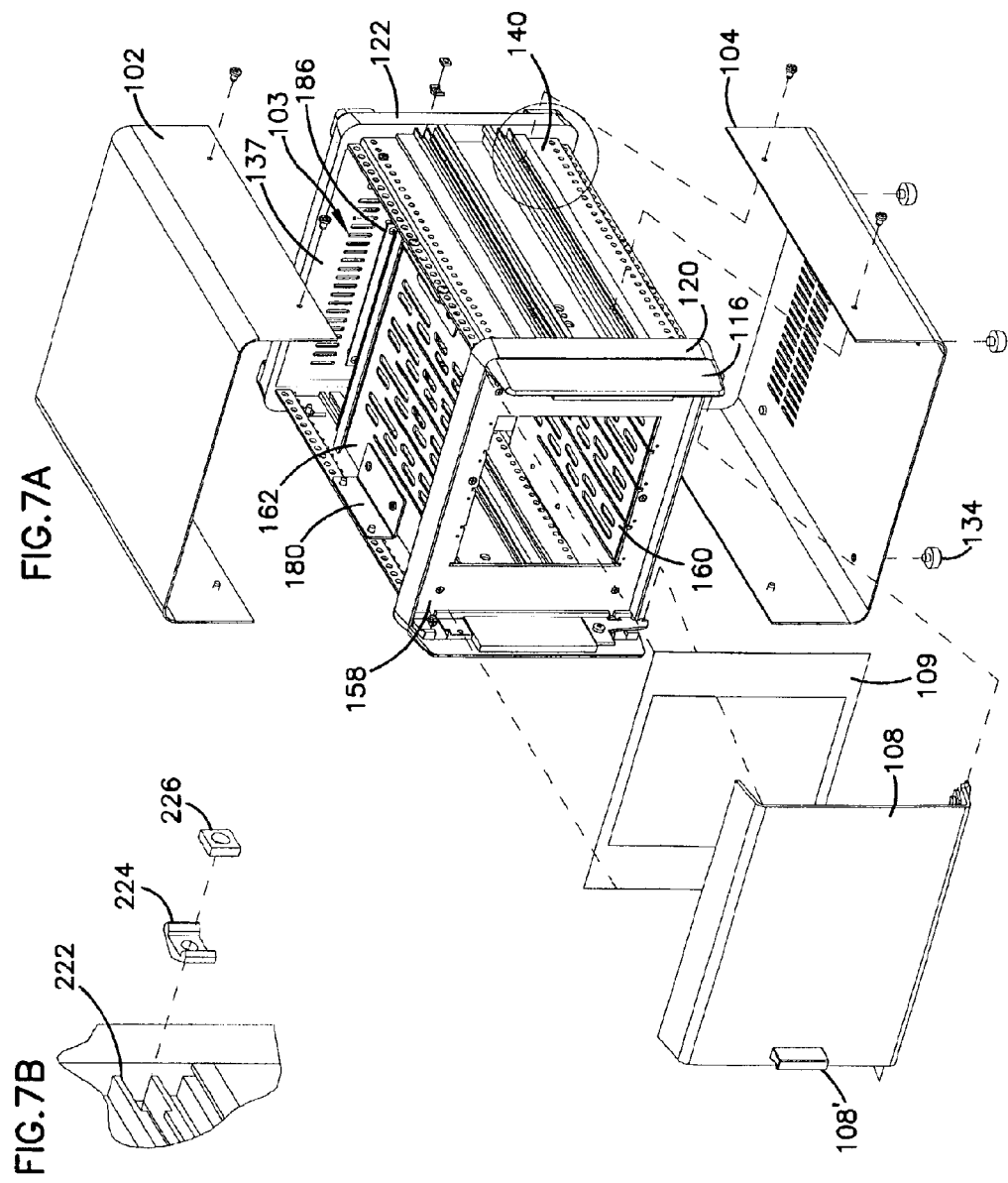

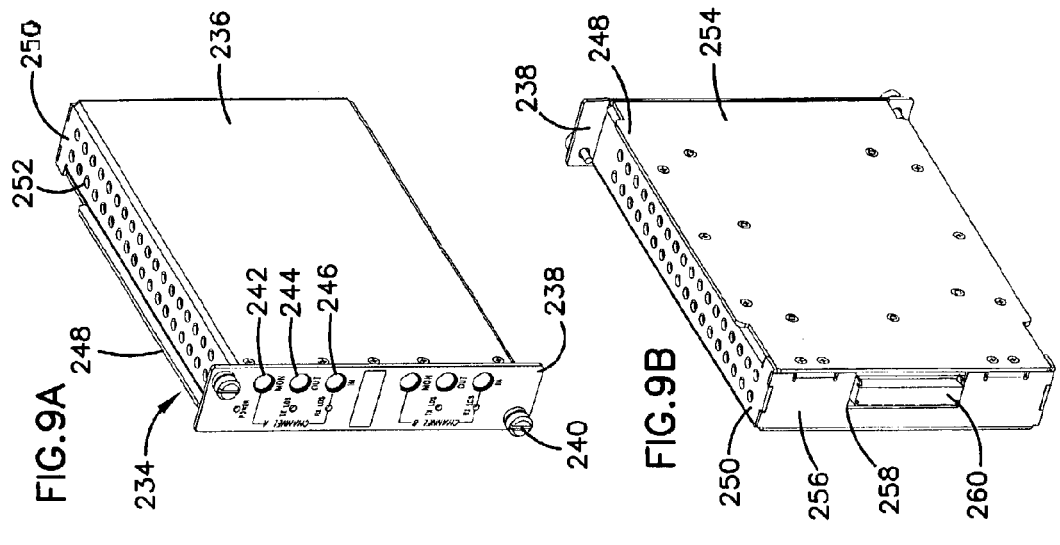
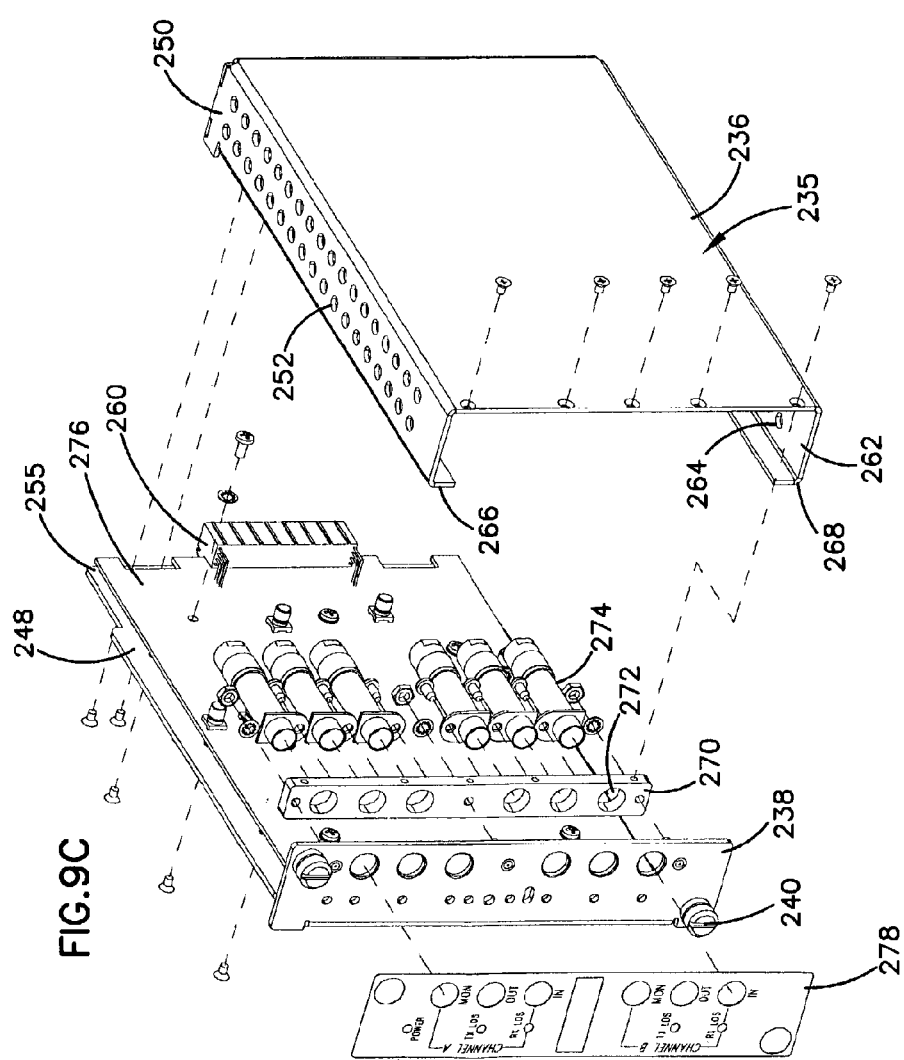

FIG.16

TELECOMMUNICATIONS CHASSIS, MODULE, AND BRIDGING REPEATER CIRCUITRY

TECHNICAL FIELD

The present invention is directed to chassis for holding telecommunications modules, the modules themselves, and the repeater circuitry that may be contained within the modules. More specifically, the present invention is directed to a chassis and module with shielding and heat dissipation structures and to repeater circuitry for bridging applications.

BACKGROUND

A telecommunications chassis provides a mounting structure for telecommunications modules housing various types of circuitry. The telecommunications chassis must provide protection from externalities while also facilitating heat dissipation from the circuitry it contains. The chassis must also attempt to shield its interior from electromagnetic interference while limiting the amount of electromagnetic interference being emitted from the interior. For certain applications, such as providing uninterrupted service during maintenance, circuitry housed by the chassis may need to be moved from place to place. Thus, portability of the chassis for this type of application becomes important as well. As the data rate being handled by the circuitry within the chassis increases, the ability to shield and protect from externalities while dissipating heat becomes more difficult.

Similarly, with the telecommunications modules that may be housed by the chassis, the circuitry within the module must be protected from externalities within the chassis such as heat, flames, loose material, and interference that may be emanating from other circuits also housed by the chassis. Because circuits fail, the module must maintain its ability to be removed from the chassis and replaced while continuing to protect the circuitry is houses during normal operation. As with a chassis, the ability of the module to shield and protect the circuitry while dissipating heat becomes more difficult as the data rate being handled by the circuitry within the module increases.

Bridging repeater circuits, which may be housed by the modules and chassis previously discussed, must take a low-level electrical monitor signal from one device, such as a digital signal cross-connect, and recreate the electrical signal with the data and clock information intact and at a high level suitable for reception by another device. Bridging repeater circuits are useful where a device has failed or must otherwise be replaced but a break in service is to be avoided. The bridging repeater circuit bridges around the faulty device from one healthy device to a replacement device to establish signal transfer prior to the faulty device being disconnected. The bridging repeater circuit is generally housed by a portable structure which needs to provide protection from heat and interference so that it may be transported to the locations of faulty devices and successfully create the output signal. As the data rate increases, the repeater circuit's ability to recover the data and clock information from the low-level monitor signal to recreate the output signal becomes more difficult.

Therefore, there is a need for a chassis to provide protection to modules from externalities and interference while facilitating heat dissipation, even at high data rates and while being portable if necessary. There is also a need for a module to provide protection to circuits from externalities and interference while facilitating heat dissipation, even at high data rates. Additionally, there is a need for a bridging repeater circuit that can recover the data and clock portions from a low-level monitor signal to recreate a high-level output signal repeating the data and clock information, even at high data rates.

SUMMARY

The present invention includes various embodiments that facilitate telecommunications functions for electrical signals, including those with high data rates such as the STM-1 rate of 155.52 megabits per second (Mbps). A chassis and a module of the present invention provide heat dissipation and shielding structures that may be used for circuits operating at these high data rates. A repeater circuit of the present invention recovers data and clock information from low-level monitor signals to create an output signal with the data and clock information intact, even at these high data rates.

The present invention may be viewed as a telecommunications chassis. The chassis includes a shielding chamber having a first and second horizontal surface and a first and second vertical surface. The first and second vertical surfaces are disposed between the first and second horizontal surfaces, and the first and second horizontal surfaces and the first and second vertical surfaces are made of metal and are conductively connected. A vertical backplane has connectors for interfacing with repeater modules and is disposed between the first and second horizontal surfaces and the first and second vertical surfaces. The vertical backplane establishes contact with the first and second horizontal surfaces and the first and second vertical surfaces and has a ground conductor that is electrically connected to the connectors. An outer housing encompasses the shielding chamber and the vertical backplane and has an open side for receiving telecommunications modules. The outer housing has a first cover surface that is substantially parallel to but within a different spatial plane from the first horizontal surface and has a second cover surface that is substantially parallel to but within a different spatial plane from the vertical backplane. Spacing between the first cover surface and the first horizontal surface and spacing between the second cover surface and the vertical backplane form an airspace. A chassis ground conductor is also included and is electrically connected to the shielding chamber and the ground conductor of the vertical backplane.

The present invention may also be viewed as a telecommunications circuit module. The module includes a printed circuit board including circuitry. A metal backplate is substantially parallel to but within a different spatial plane from the printed circuit board. A metal shell has a frontplate, a top surface perpendicular to and extending from the frontplate, a bottom surface substantially parallel to the top surface and extending from a side of the frontplate away from the top surface, and a back surface perpendicular to the front plate and the top and bottom surfaces. The top surface, bottom surface, and back surface each has a folded edge that abuts the metal backplate to establish metal to metal contact. A metal jack holder extends perpendicularly from the printed circuit board and abuts the front plate, top surface, and bottom surface to establish metal to metal contact along a side away from the back surface. At least a portion of the circuitry is disposed between the frontplate and the backplate and between the metal jack holder and the back surface.

The present invention may be viewed as a repeater circuit. The repeater circuit includes an amplification portion that receives a first signal with data and clock information and increases the amplitude of the first signal to generate an amplified first signal. The amplification portion includes a current feedback amplifier stage and a voltage limiting amplifier stage. A transceiver portion receives the amplified first signal with increased amplitude, recovers the data and clock information from the received amplified first signal, and transmits a second signal with the data and clock information recovered from the first signal.

DESCRIPTION OF THE DRAWINGS

FIGS. 1A and 1B are front and back perspective views of an embodiment of the chassis of the present invention.

FIGS. 2A and 2B are perspective and right side views, respectively, of the sidewalls and front and rear trim pieces of the chassis.

FIGS. 4A and 4B are a rear perspective view of the chassis without the outer coverings and an exploded perspective view of the rear cover piece and power supply, respectively.

FIGS. 5A, 5B, and 5C are a plan view of the uninstalled rear cover piece, power supply, and vertical backplane, a perspective of the rear cover piece and power supply showing ground wire connections, and a perspective with the top cover removed to show its ground wire connection.

FIGS. 7A, 7B, and 7C are an exploded perspective view of the chassis, an exploded detail view of the top outer covering fastener, and an exploded detail view of the bottom outer covering fastener, respectively.

FIGS. 9A, 9B, 9C, and 9D are a front perspective view, a rear perspective view, and exploded perspective views of an embodiment of the module of the present invention.

FIG. 16 is a top layer view of the printed circuit board showing input signal paths.

DETAILED DESCRIPTION

Figures 3A, 3B:
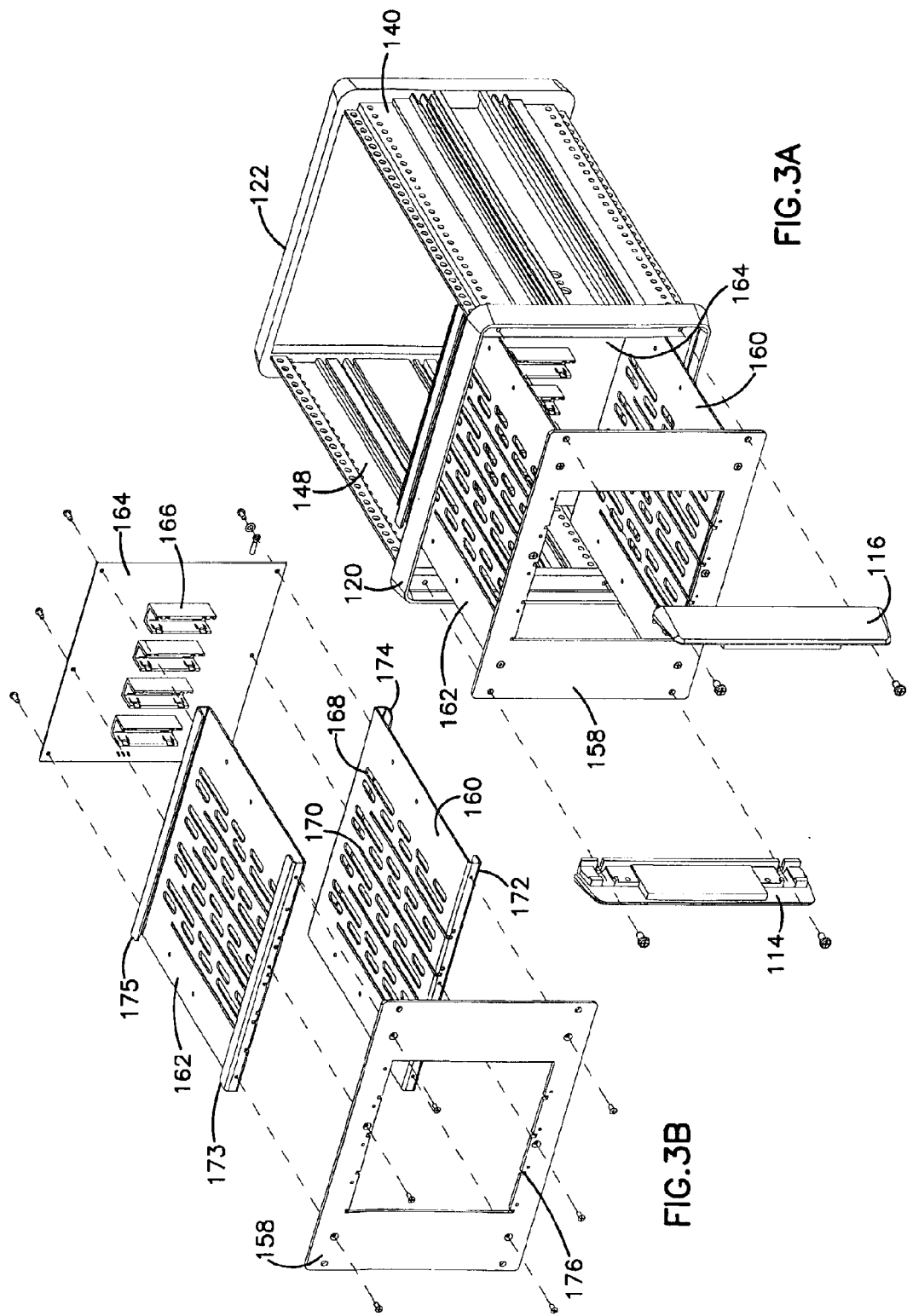
FIGS. 3A and 3B are an exploded perspective view of inner components of the chassis and a perspective view of the chassis without outer coverings with the inner components being installed.

Various embodiments of the present invention will be described in detail with reference to the drawings, wherein like reference numerals represent like parts and assemblies through the several views. Reference to various embodiments does not limit the scope of the invention, which is limited only by the scope of the claims attached hereto.

Embodiments of the present invention provide a chassis design that facilitates high-speed data rates of electrical signals through implementation of structures that provide heat dissipation and shielding. Embodiments also provide a module design that further facilitates high-speed data rates of electrical signals through implementation of additional structures that provide heat dissipation and shielding. Bridging repeater circuitry embodiments of the present invention also facilitate high-speed data rates of electrical signals by implementing structures that recover the data and clock portions of a low-level monitor signal through sufficient amplification and create a higher-level output signal repeating the data and clock portions.

FIGS. 1A and 1B illustrate an embodiment of the chassis of the present invention. The chassis 100 has a top cover 102, a bottom cover 104, and a rear cover 137 forming an outer housing 105. Front trim piece 120 and rear trim piece 122 fit around the rear edges of the top cover 102 and bottom cover 104, respectively. Front extensions 114, 116 extend forward from the front trim piece 120.

A door 108 is connected to the front extensions 114, 116 through hinges 112. The door 108 has a finger 110 that catches on the left front extension 114 to hold the door 108 closed. A rotatable handle 106 is connected to the chassis 100 through mount 107. One or more covers 118 are mounted on the chassis 100 to isolate the interior of the chassis 100 when corresponding modules are not present.

The rear cover 137 has several rows of holes 138 for exhausting heat produced by the modules housed within the chassis 100. The rear cover 137 also has a power socket 130 with electrical connections 132 for receiving AC power, such as 110V and/or 220V, from an external source. Typically, power socket 130 is internally fused and is switchable to receive either either voltage. Rails 124, 128 are mounted to the rear trim piece 122 and have feet 126 attached to them. The bottom cover 104 has a several rows of holes 136 for passing ambient air into the interior of the chassis 100. The bottom cover 104 also has several feet 134.

FIGS. 2A and 2B show sidewalls 140, 148 of the chassis 100. The sidewalls 140, 148 are held in position by attachment to the front and rear trim pieces 120, 122. Several holes 150 are located at the top and the bottom of the left sidewall 148. Similarly, several holes 142 are located at the top and bottom of the right sidewall 140.

Ridges 152 are provided in the left sidewall 148, and ridges 144 are provided in the right sidewall 140. An inwardly recessed region 154 in the left sidewall 148 and inwardly recessed region 146 in the right sidewall 140 is created between the sets of ridges 152 and 144. The inwardly recessed portions 154, 146 are exposed between the top cover 102 and the bottom cover 104, and the ridges 152, 144 facilitate attachment of the top cover 102 and bottom cover 104 to the sidewalls 140, 148 as discussed below. Handle mount holes 156 are provided in the recessed portions 154, 146 to allow attachment of the handle mount 107.

FIGS. 3A and 3B illustrate the assembly of the interior structures of the chassis 100. A top horizontal surface 162 and a bottom horizontal surface 160 mount to a faceplate 158 and a vertical backplane 164. Both the top and bottom horizontal surfaces 162, 160 have several rows of ventilation holes 168 that allow air to pass up from the bottom of the chassis 100 through the installed modules and into the top of the chassis 100 where it is channeled between the top cover 102 and the top horizontal surface 162 and exhausted out the rear of the chassis 100 through holes 138.

As can be seen the top and bottom horizontal surfaces 162, 160 have curled edges 172, 173, 174, and 175 that abut the faceplate 158 and the vertical backplane 164. Each of these surfaces except the vertical backplane 164 is made of metal, such as cold rolled steel with a zinc chromate plating, such that metal-to-metal contact is established between them. The backplane 164 is typically printed circuit board material. Likewise, the sidewalls 140, 148 are also made of metal, such as aluminum, and establish electrical continuity with the top and bottom horizontal surface 162, 160 through metal brackets discussed below. A Faraday box, or shielding chamber, results which provides shielding for the modules housed by the chassis 100. The grounding of the shielding chamber is discussed below. Similarly, an outer Faraday box results from the metal top and bottom covers 102, 104 and the metal rear cover 137 whose grounding is also discussed below.

The vertical backplane has connectors 166 that allow the modules to be inserted into the chassis 100 and slidably engage connectors 166 to establish electrical connection. The vertical backplane connectors 166 typically provide DC power to the modules from a chassis power supply discussed below. The top and bottom horizontal surfaces 162, 160 have slots 170 that receives fins on the module to guide it as it is inserted and to prevent lateral movement once it is installed. As best seen in FIG. 3B, the faceplate 158 has notches 176 that align with the slots 170.

FIG. 4A shows the chassis 100 with the top cover 102 and the bottom cover 104 of the outer housing 105 removed. As shown the shielding chamber 101 is fully installed in the chassis 100. The shielding chamber 101 is held in place by brackets 178, 180 that mount to both the top horizontal surface 162 and the sidewalls 140, 148. As can be seen an airspace 103 is created by the placement of the shielding chamber 101. The airspace 103 of this embodiment includes the area between the top horizontal surface 162 and the top cover 102, the area between the rear cover 137 and the vertical backplane 164, and the area between the bottom horizontal surface 160 and the bottom cover 104.

The airspace 103 allows air to enter through the bottom cover 104, rise through the shielding chamber 103, return to the rear of the chassis 100, and exit out the rear cover 137. Air may also enter through the bottom cover 104 and rise directly between the vertical backplane 164 and the rear cover 137 and then exit from the chassis 100. As shown in FIG. 4B, the chassis power supply 186 is mounted to the rear cover 137, and the air rising up the vertical backplane 164 may assist in dissipating heat from the power supply 186. Because the top cover 102 has no holes, any flames imposed on the interior of chassis 100 cannot escape from the top and are, therefore, adequately contained.

Also shown in FIG. 4B, the rear cover has an aperture 184 that is used to mount the power socket 130. The power socket 130 has rear terminals 182 for electrical connection to the power supply 186. Also, a portion of the holes 138 of the rear cover 137 lie directly behind the power supply 186 and allow it to radiate some heat directly out of the chassis 100. Mounting the power supply 186 directly to the rear cover 137 also permits easy installation and maintenance of the power supply 186 because it can be accessed by simply removing the rear cover 137 and its electrical connections can be easily made while the rear cover 137 is removed.

Figure 5C:
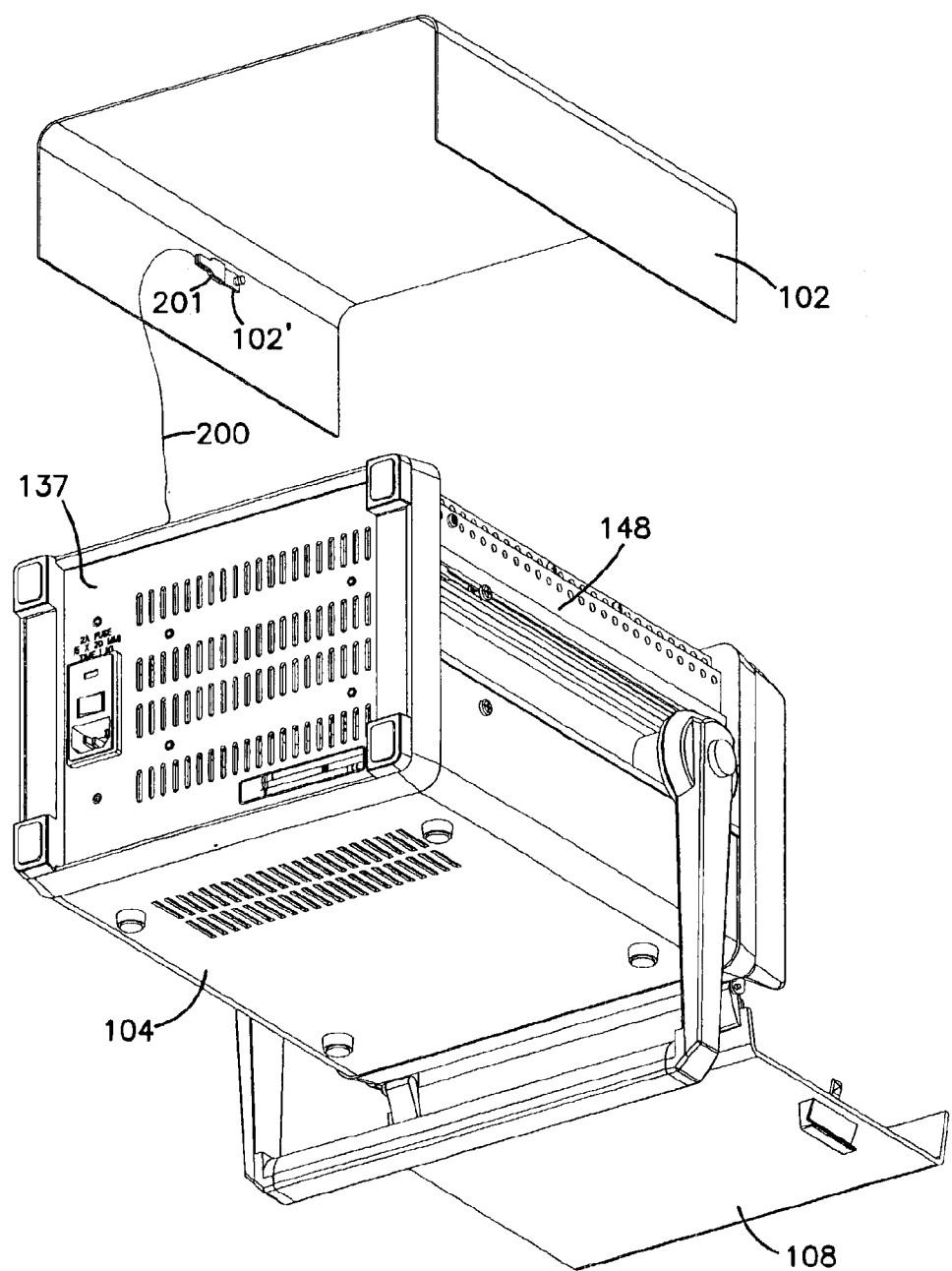

FIGS. 5A, 5B, and 5C show the ground wire connections of the shielding chamber 101, vertical backplane 164, and outer housing 105, and also shows the power connections of the power supply 186. The power supply 186 typically receives AC power from the power socket 130 through wires 208 and 210 connected to jack 216 of the power supply 186. The power supply 186 then typically outputs DC power through output jack 218 to the vertical backplane 164 through wires 212 and 214 where it is then distributed to each of the connectors 166.

A ground tab 220 of the power supply 186 is electrically connected to the ground prong 207 of the power socket 130 through wire 206. The ground tab 220 is electrically connected to a ground post 190 of the rear cover 137 through wire 204. Ground wires are fixed to the ground post 190 and ground post 188 of the rear cover 137 through the fastening assembly 192.

A ground conductor 164' of the vertical backplane 164 that electrically connects the vertical backplane 164 to shielding pins of connectors 166 is also electrically connected to the ground post 190 through wire 196. The right sidewall 140 is connected to the ground post 188 through wire 198. The left sidewall 148 is connected to the ground post 188 through wire 202. The top cover 102 is connected to the ground post 188 through wire 200, and the bottom cover 104 is connected to the ground post 190 through wire 194.

The top cover 102 and bottom cover 104 of the outer housing 105 have conductor tabs 102' that extend from them for receiving connectors 201 of the ground wires 200 and 194. The top cover 102 and bottom cover 104 may have a powder coat finish applied and the conductor tabs 102' remain bare metal to establish electrical continuity with the ground wires 200, 194.

Figure 6:
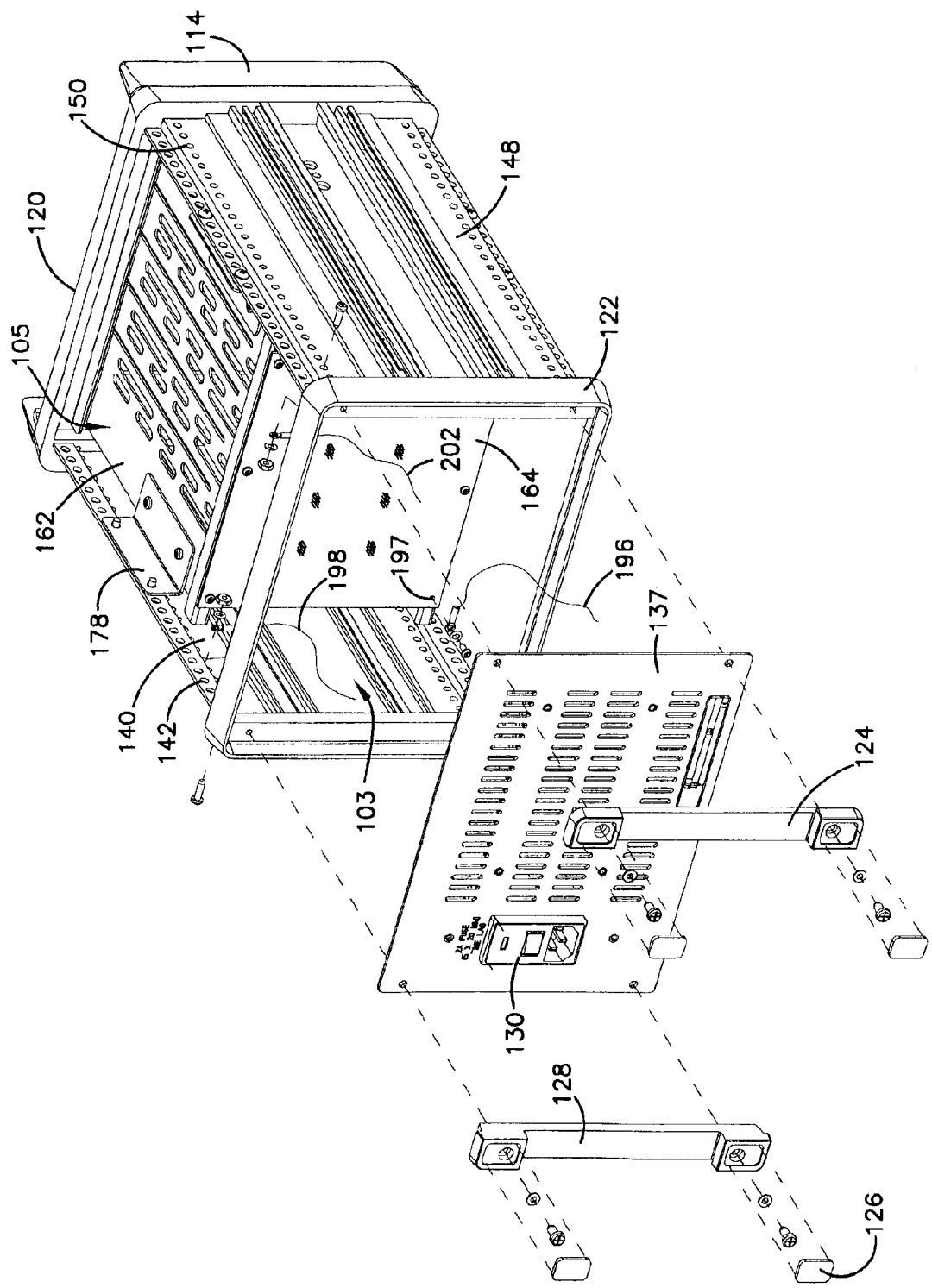
FIG. 6 is a rear perspective view of the chassis without outer coverings showing ground wire connections and the rear cover piece installation.

FIG. 6 shows the installation of the rear cover 137 and left and right rails 124, 128 as well as the connections of the ground wires to the sidewalls 140, 148. Because the rear cover 137 is mounted to the rear trim piece 122, the airspace 103 remains between the rear cover piece 137 and the vertical backplane 164. The airspace 103 accommodates the power supply 186.

The ground wire 198 extending from ground post 188 fastens to the right sidewall 140 through one of the holes 142 in the top of the sidewall 140. Likewise, the ground wire 202 extending from ground post 188 fastens to the left sidewall 148 through one of the holes 150 in the top of the sidewall 148. The ground wire 196 extending from ground post 190 fastens to a mounting hole 197 of the vertical backplane 164 that is also used to attach the vertical backplane 164 to the bottom horizontal surface 160.

FIG. 7A shows an exploded view of the chassis 100. As can be seen, the power supply 186 is placed within the airspace 103, which is maintained by the spacing between the top cover 102 and top horizontal surface 162, between the vertical backplane 164 and the rear cover 137, and between the bottom cover 104 and the bottom horizontal surface 160. A covering 109 may be placed over the faceplate 158 for aesthetics. The door 108 has a handle 108' extending forwardly to facilitate opening and closing.

FIG. 7B shows a fastener for holding the top cover 102 onto the sidewall 140. The ridges 144 of the sidewall 140 have a notched end 222 that receives a nut holder 224 and nut 226 that fits within the nut holder 224. As shown in FIG. 7C, a nut holder 224 and nut 226 has been positioned by sliding it within the ridges 144 from the notched end 222 to an alignment dimple 230. A screw passes through a hole in the bottom cover 104 to hold it in place. As shown, the top cover 102 and bottom cover 104 are both attached by four of these fasteners.

Figure 8A:
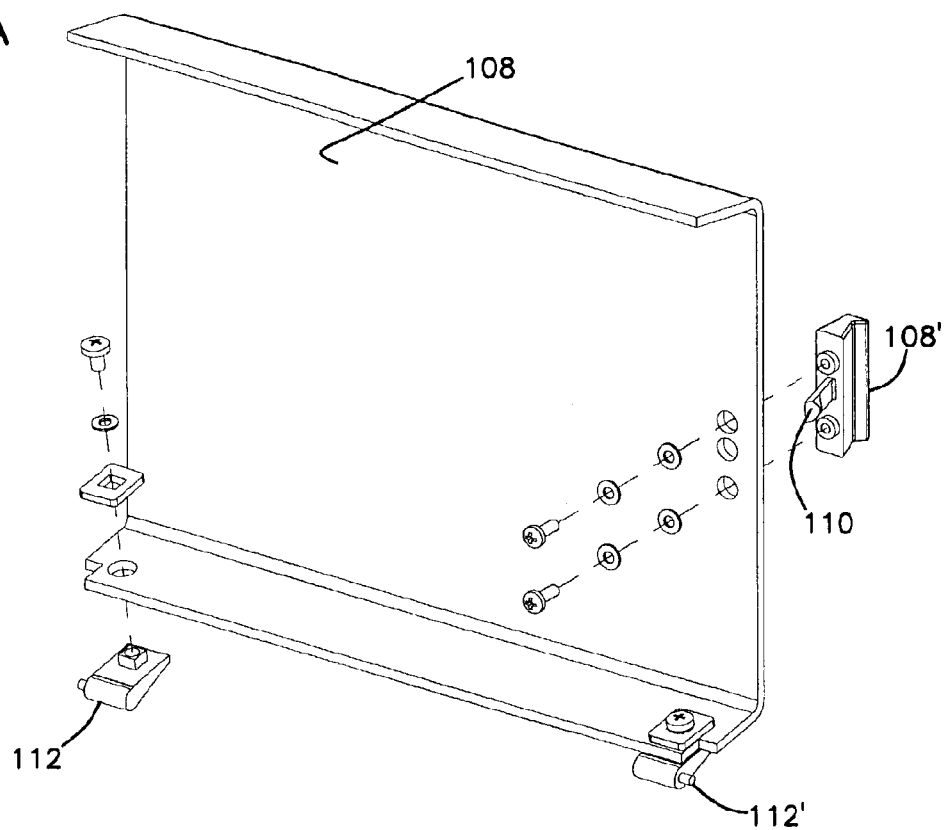
FIGS. 8A and 8B are perspective views of an uninstalled door and hinge guide, respectively.
Figure 8B:
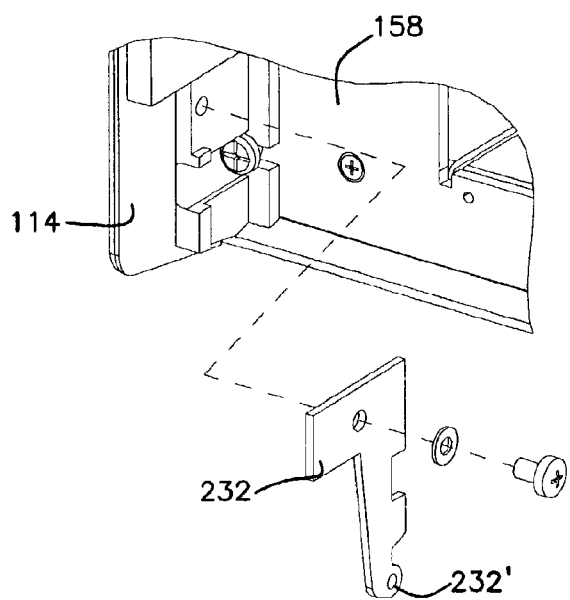

FIG. 8A shows the door 108 of the chassis 100. The door 108 includes the handle 108' which has the finger 110 extending from it. The finger 110 passes through a hole in the door 108 so that it may engage the front extension 114. FIG. 8B shows a hinge guide 232 that mounts to the front extensions 114, 116. The hinge guide 232 has a hole 232' for receiving a hinge shaft 112' extending from hinge 112 that mounts the door 108 but allows it to open and close.

FIGS. 9A, 9B, 9C, and 9D show an embodiment of the module of the present invention. The module 234 has a shell 235 that has a frontplate 236, a top surface 250, a bottom surface 262, and a back surface 256. The top surface 250 has several ventilation holes 252, and the bottom surface 262 has ventilation holes 264. The ventilation holes allow air to rise from the bottom of the chassis such as chassis 100, up through the modules 234 installed in the chassis 100, and into the top of the chassis 100 prior to being exhausted through the rear cover 137. The shell 235 is typically made of metal, such as aluminum. The edge 266 of the top surface 250 is folded, as is the edge 268 of the bottom surface 262. The edge 257 of the back surface 256 is also folded.

A metal backplate 254 that is typically made of aluminum mounts to the edges 266, 268, 257 of the shell 235. The metal backplate 254 supports a printed circuit board 276. Portions 255 of the metal backplate 254 extend beyond the perimeter of the printed circuit board 276 and provide a surface that can establish metal-to-metal contact with the folds of edges 266, 268, and 257.

Connector jacks 274 pass signals between the circuitry on the printed circuit board 276 and external cable connectors (not shown). A metal jack holder 270 is mounted to the shell 235 and to a faceplate 238. The metal jack holder 270 provides support for the connector jacks 274 with holes 272 that surround the cylindrical sleeve of the connector jacks 274. The metal jack holder 270 also establishes metal-to-metal contact with the shell 235 and with the faceplate 238. The faceplate 238 also establishes metal-to-metal contact with the backplate 254 and the front edges of the shell 235.

The printed circuit board 276 is enclosed within the shell 235, the backplate 254, and the jack holder 270 which together form a Faraday box providing shielding for the circuitry on the printed circuit board 276. A connector 260 is mounted to the printed circuit board 276 and is in electrical communication with the circuitry. Typically, the connector 260 provides DC power from the vertical backplane connector 166 to the circuitry. The back surface 256 of the shell 235 has an opening 258 that allows the connector 260 to pass through. Typically when maximizing shielding, the largest dimension of the opening is one-twentieth or less of the shortest wavelength of the signal to be handled by the circuitry.

The faceplate 238 has several holes for sending and receiving signals to and from coaxial cables. For a module 234 housing a repeater circuit, such as the bridging repeater circuit of the present invention, a monitor out port 242, a signal out port 244 and a signal in port 246 are provided for each data channel. As shown, the module 234 houses two data channels. The faceplate may have a decal 278 attached to it to provide a visual indication of the purpose of each jack, light emitting diode (LED), switch, or other feature provided on the faceplate 238.

The faceplate 238 generally has a fastener 240 for attachment to the chassis 100. The metal backplate 254 has fins 248 located on the top and bottom edges. The fins 248 fit within the notch 176 of the chassis faceplate 158 and within the slot 170 of the top and bottom horizontal surfaces 162, 160 shown in FIG. 3B.

Figure 9D:
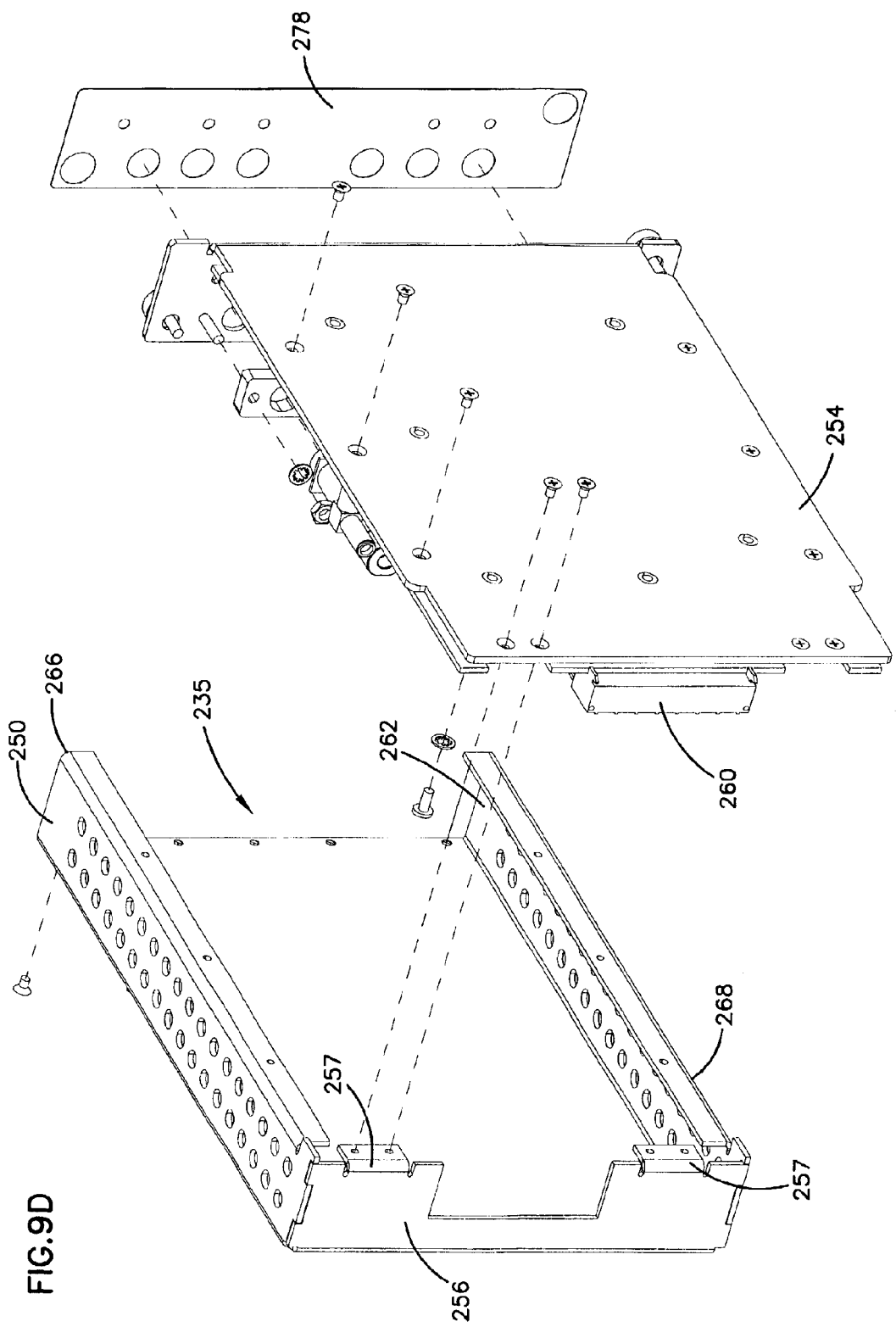
Figure 9E:
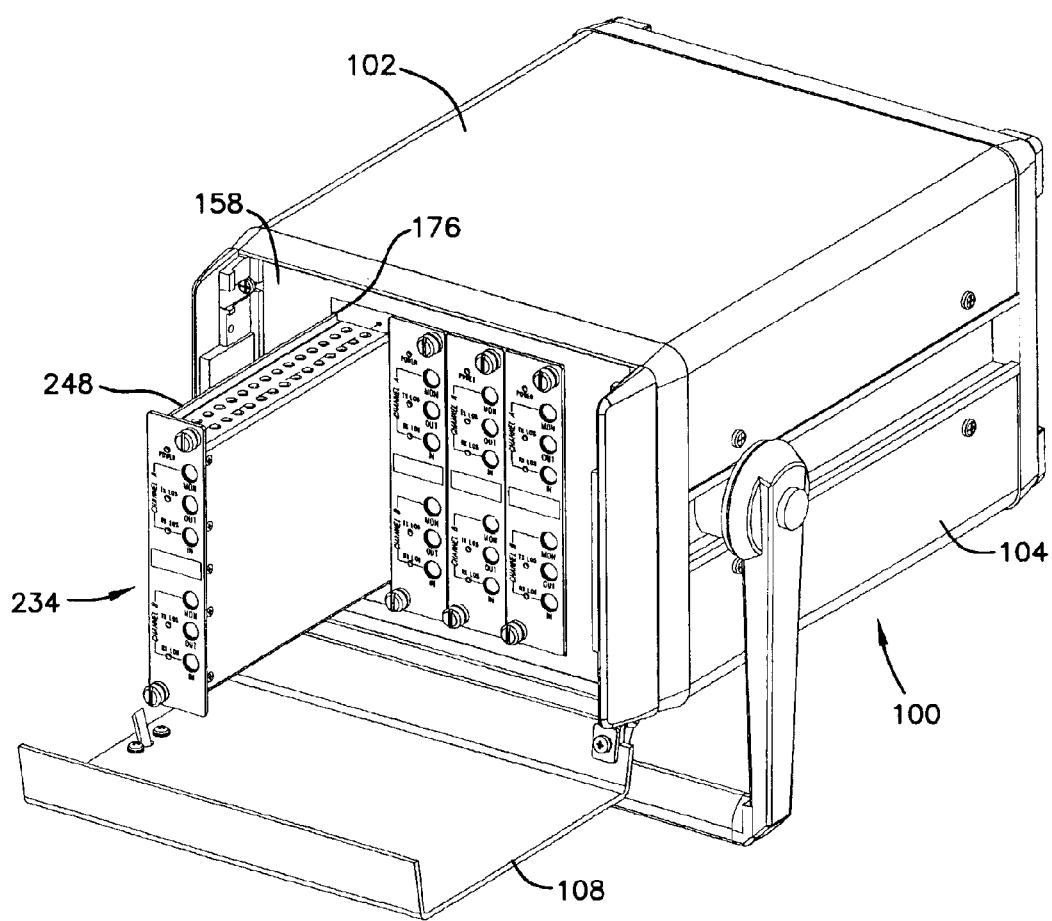
FIG. 9E is a perspective view of the chassis with a module partially inserted.

FIG. 9E shows the chassis 100 with a module 234 being partially installed. The fins of the module 234 pass into the slots 170 of the top and bottom horizontal surfaces 162, 160 and notch 176 of the chassis faceplate 158. The module 234 slides into the opening in the chassis faceplate 158 and then continues to slide into the shielding chamber until the module connector 260 engages the vertical backplane connector 166.

Figure 10:
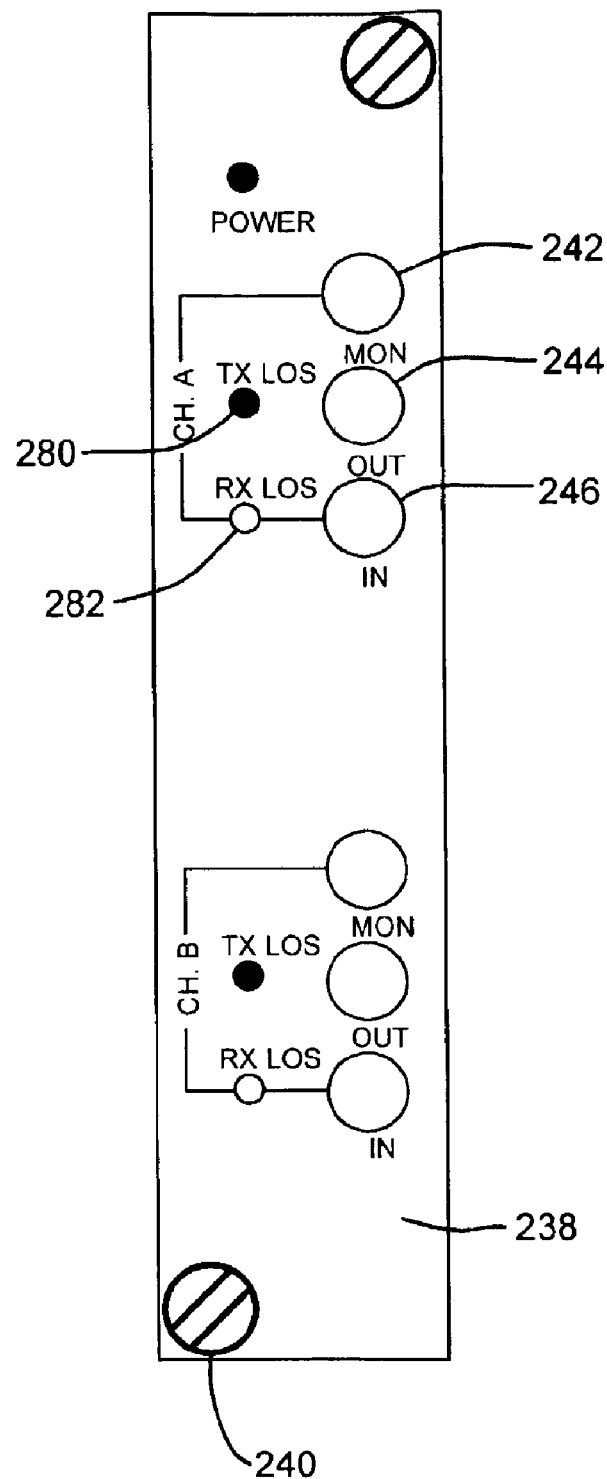
FIG. 10 is a plan view of the faceplate of the module.

FIG. 10 is a closer view of the faceplate 238 of the module 234. The faceplate 238 has the ports for monitor output 242, signal output 244, and signal input 246. In addition, the faceplate may have a loss of signal (LOS) LED 282 that lights to indicate the signal through signal input port 246 is not adequately present. An LOS LED 280 may also be provided to indicate that the signal through signal output port 244 is not adequately present. Ports and LEDs for both a channel A and a channel B are shown.

Figure 11:
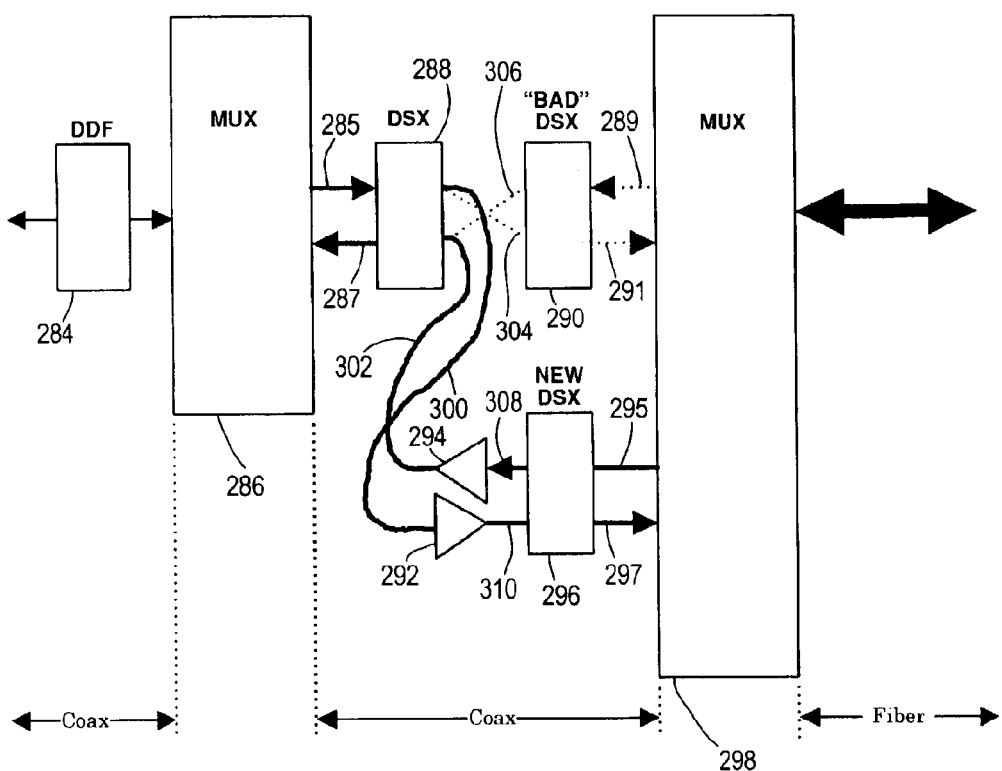
FIG. 11 is a high-level block diagram showing the application of the bridging repeater circuit embodiment of the present invention to a network environment.

FIG. 11 shows an exemplary network environment employing bridging repeater circuits of the present invention. A bridging repeater circuit 294, which may be channel A or B of a module such as module 234, is included as is a second bridging repeater circuit 292 which may be the other channel of the module. The bridging repeater circuits 292, 294 are being used to bypass a faulty digital signal cross-connect circuit (DSX) 290 without disrupting the signal path between the healthy DSX 288 and the electrical to optical (E/O) multiplexer (mux) 298. The bridging repeater circuits 292, 294 may be housed in a module 234 for installation in portable chassis 100, or they may be housed in a module suitable for installation in an existing chassis in the network environment such as a chassis with positions for the DSX devices.

Signal transmission through the portion of the network shown passes between several digital distribution frames (DDF) 284 that pass electrical signals to the mux 286 where they are multiplexed into an output line 285. The mux 286 also receives multiplexed signals from a healthy DSX 288 through input line 287 and demultiplexes them for transfer to the several DDFs 284. The healthy DSX 288 has output line 304 that feeds into the input of the faulty DSX 290. The faulty DSX 290 has an output line 306 that feeds into the input of the healthy DSX 288.

The faulty DSX 290 passes signals to the E/O mux 298 through line 289 and receives signals from the E/O mux 298 through line 291. When the faulty DSX 290 needs to be temporarily or permanently replaced, a new DSX 296 is installed with a line 295 receiving signals from the E/O mux 298 that are the same as those signals received by the faulty DSX 290 through line 289. The new DSX 296 is also installed with a line 297 sending signals to the E/O mux 298. As discussed below, this line 297 duplicates the signal being provided over line 291 from the faulty DSX 290 to the E/O mux 298.

The bridging repeater circuit 294 receives at its input the monitor signal output by the new DSX 296 through line 308. The bridging repeater circuit 294 retransmits the data and clock information of the signal received from the new DSX 296 to the healthy DSX 288 through line 302 that connects to a make-before-break input jack of the healthy DSX 288 used for temporary connections. Because of this completed circuit through the bridging repeater circuit 294, the line 306 connecting the output of faulty DSX 290 to the permanent input of healthy DSX 288 can be disconnected from the faulty DSX 290 and then redirected to the permanent output of new DSX 296 without breaking service in the channel.

The bridging repeater circuit 292 receives at its input the monitor signal output by the healthy DSX 288 through line 300. The bridging repeater circuit 292 retransmits the data and clock information of the signal received from the healthy DSX 288 to the new DSX 296 through line 310 that connects to a make-before-break input jack of the new DSX 296 used for temporary connections. Because of this completed circuit through the bridging repeater circuit 292, the line 304 connecting the input of faulty DSX 290 to the permanent output of healthy DSX 288 can be disconnected from the faulty DSX 290 and then redirected to the permanent input of new DSX 296 without breaking service in the channel. Once the healthy DSX 288 and the new DSX 296 have established communication in both channels through permanent connections, bridging repeater circuits 292 and 294 can be disconnected from both the healthy DSX 288 and the new DSX 296.

Figure 12:
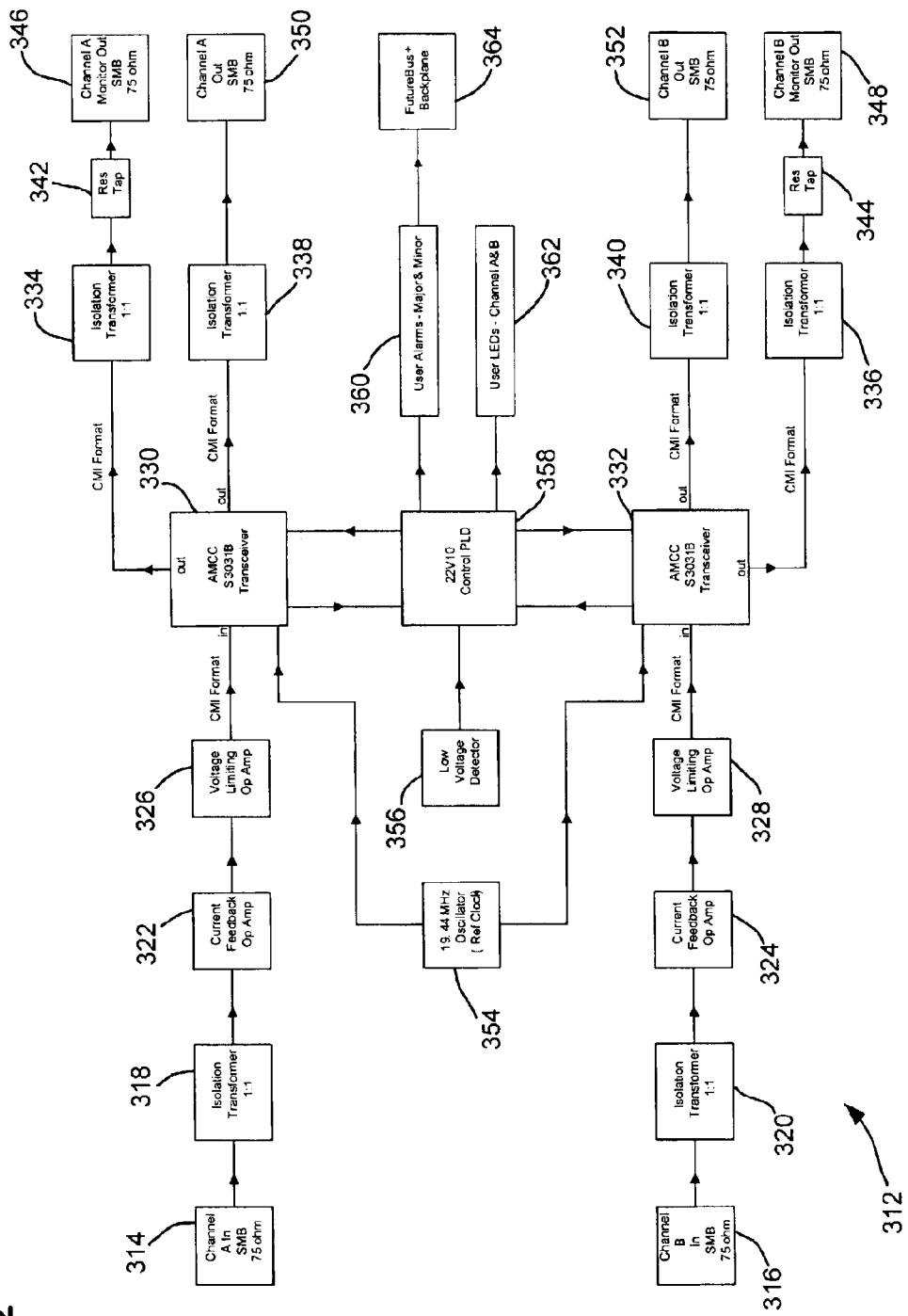
FIG. 12 is a block diagram of the circuitry of the bridging repeater circuit.

FIG. 12 shows a block diagram of the circuitry 312 of the bridging repeater circuits 292 (channel A) and 294 (channel B). The bridging repeater circuit input is typically a 75 ohm SMB connector 314, 316 for both channel A and channel B that receives the monitor signal at approximately 0.1 Volts (V). The input connectors are electrically connected to isolation transformers 318, 320 for channels A and B, and the transformers have a turns ratio of 1:1. The isolation transformers 318, 320 are electrically connected to the amplification portion of the input section that includes a current feed back operational amplifier 322, 324 for each channel in series with a voltage limiting operational amplifier 326, 328 for each channel.

The voltage limiting operational amplifier 326, 328 of each channel feeds the amplified signal containing data and clock information, such as in a coded mark inversion (CMI) format, to an analog data input of the transceiver 330, 332 of each channel. The transceiver 330, 332 recovers the data and clock information from the signal and creates an output signal that repeats the data and clock information, also in CMI format. The transceiver output is connected to an additional isolation transformer 338, 340 that passes the output signal to the output jack 350, 352, which may also be a 75 ohm SMB connector. The output signal may pass through a voltage divider network (not shown) prior to reaching the output jack 350, 352 but the output signal is typically around 2 V.

The transceiver output is also connected to another isolation transformer 334, 336 that passes the output signal to an additional voltage divider 342, 344 that is connected to a monitor jack 346, 348, which may also be a 75 ohm SMB connector. The additional voltage divider 342, 344 decreases the output signal received by the monitor jack 346, 348 by about 27 dB.

A reference clock 354, which is typically a 19.44 MHz oscillator, feeds a reference clock signal to the transceivers 330, 332. Rather than using a single oscillator, a separate oscillator for each transceiver 330, 332 may also be employed. A low-voltage detector 356 may also be included to detect an under-voltage power supply condition. The low-voltage detector 356 feeds a detection signal to a programmable logic device (PLD) control 358.

The PLD 358 also communicates with the transceivers 330, 332 to determine whether the signals being received or output by the transceiver are of an adequate level. If the PLD 358 receives a detection signal from detector 356 indicating an improper supply voltage, the PLD 358 will trigger a major or minor alarm circuit 360 which is in communication with the backplane 364. If the PLD 358 receives a transmit or receive signal from the transceiver 330, 332, it triggers a user LED 362 for channel A or B corresponding to transmit or receive to provide an indication of the loss of signal.

Figure 13:
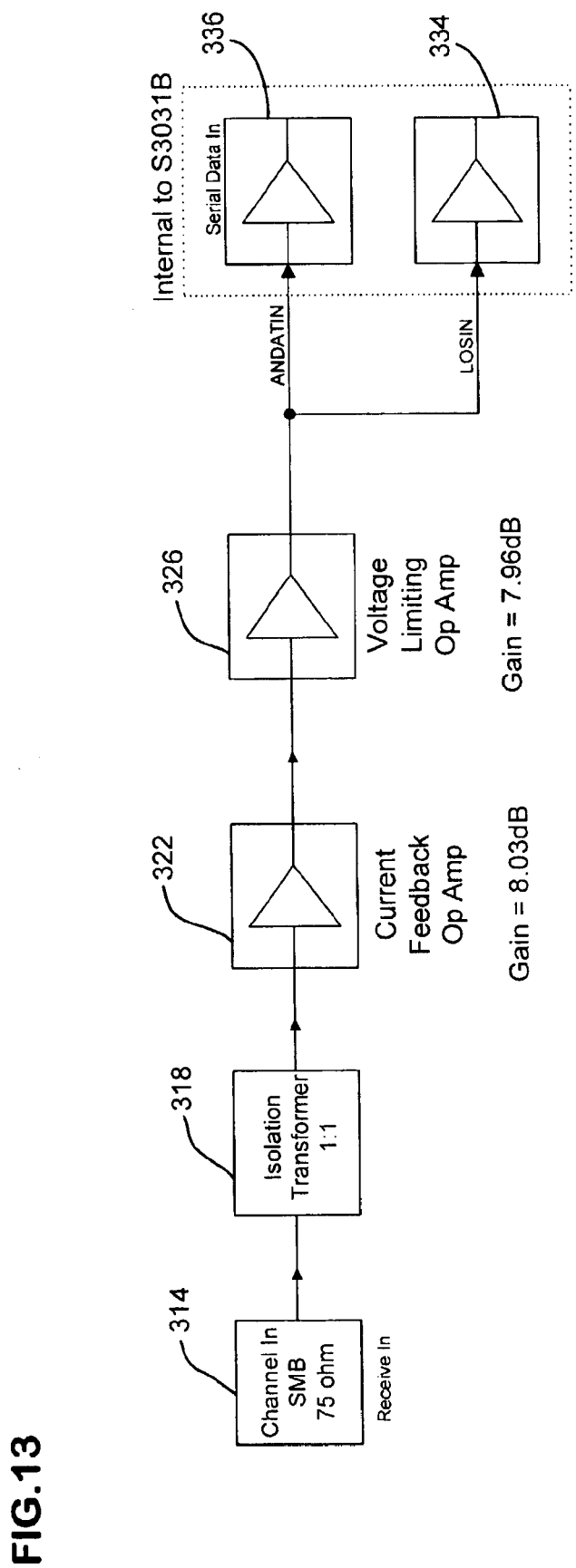
FIG. 13 is a block diagram of the input section of the bridging repeater circuit.

FIG. 13 shows the input channel and some of the transceiver components in more detail for channel A. Two amplification stages are utilized to provide a sufficient Gain-Bandwidth product to increase the 0.1 V monitor signal to 0.5 V peak-to-peak before it is delivered to the transceiver 330. At relatively high data rates for electrical signals, such as 155.52 Mbps for STM-1 transmission, the bandwidth of the amplification portion must also be relatively large so as to include the highest frequency for that data rate. The current feedback operational amplifier, such as the Burr-Brown OPA658, is configured to produce a significant portion of the overall gain.

A voltage divider network is included with the current feedback amplifier 322 to provide a source for the voltage limiting amplifier 326. The output of the voltage divider has a gain of about 8 dB over the monitor signal. The Burr-Brown OPA658 has a sufficient gain bandwidth product to provide the 8 dB of gain through the voltage divider while maintaining a frequency response suitable for a 155.52 MHz signal, as might be received for a 155.52 Mbps data rate.

The voltage limiting amplifier 326, such as the Burr-Brown OPA689, also produces a significant portion of the overall gain. A voltage divider circuit is included with the voltage limiting amplifier 326 to provide a source for the transceiver 330. The output of the voltage divider has a gain of about 8 dB over the signal received from the current limiting amplifier 322. The Burr-Brown OPA689 has a sufficient gain bandwidth product to provide the 8 dB of gain through the voltage divider while maintaining a frequency response suitable for a 155.52 MHz signal.

The voltage limiting amplifier 326 has the additional task of limiting the voltage received by the transceiver 330. The transceiver 330 has an input sensitivity range, and the voltage limiting amplifier 326 provides an output through the voltage divider that is guaranteed to be within a designated range, even if the monitor signal has an amplitude greater than anticipated. For the AMCC model S3031B STM-1 transceiver, which is a fully integrated CMI encoding transmitter and CMI decoding receiver, the input sensitivity is from 110 milli-volts (mV) to 1.3 V. Thus, it is desirable to constrain the output of the voltage divider of the voltage limiting operational amplifier 326 to fit within this range, and a 0.5 V peak-to-peak voltage is suitable. This limit is set-up using a voltage divider discussed in more detail below.

The transceiver 330 has an analog data input leading to a data/clock recovery circuit 336. The transceiver also has a loss of signal input feeding a LOS circuit 334. The LOS circuit 334 receives the input signal from the voltage limiting amplifier stage 326 after it has passed through an additional voltage divider network that reduces the signal to about 0.170 volts to set the floor for adequate signal strength. If the signal at the analog data input drops below the 0.170 V reference, the LOS out line passing to the PLD 358 is activated.

Figure 14:
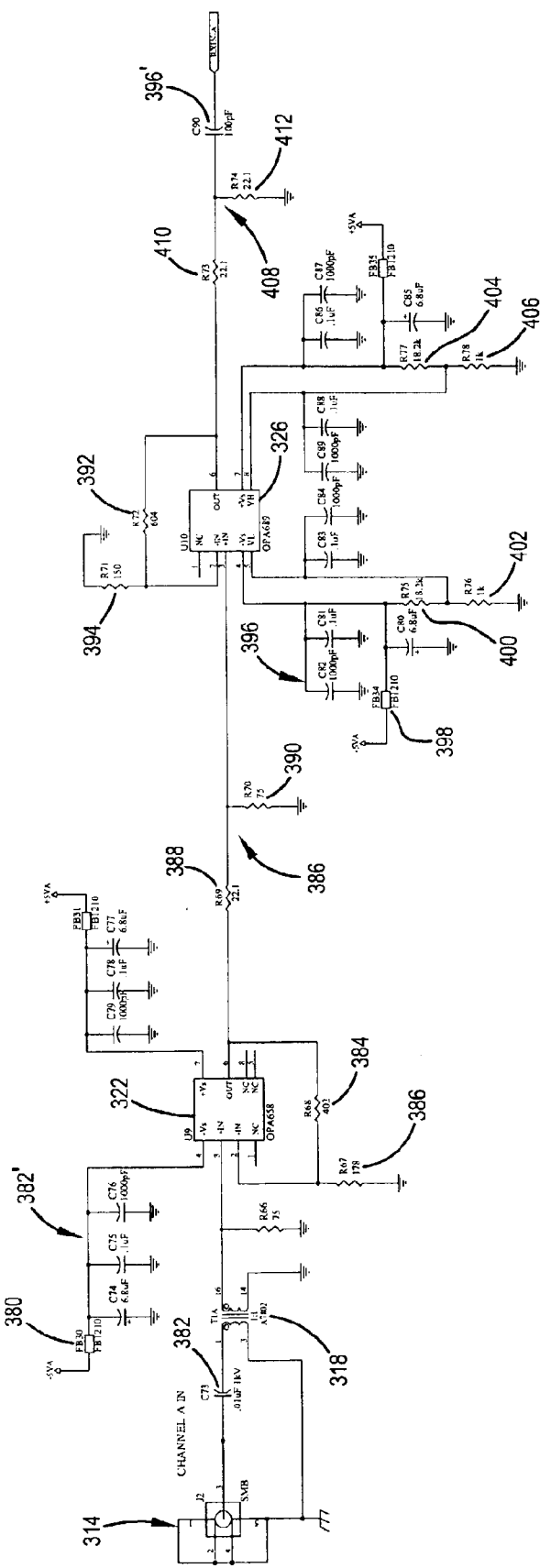
FIG. 14 is a circuit schematic of the input section.

FIG. 14 shows the input circuit in more detail. A decoupling capacitor 382 and power supply filtering capacitors 382' are included as is a ferrite bead 380 to reduce electromagnetic emissions from the power supply. The current feedback operational amplifier is configured with a 402 ohm feedback resistor 384 and a 178 ohm resistor 318 tied to ground and the inverting input to produce a gain of 3.26= (1+402/178). The voltage divider 386 of the current feedback stage includes a 22.1 ohm resistor 388 and a 75 ohm resistor 390 that cut the gain to 2.52=[3.26*75/(22.1+75)].

The voltage limiting operational amplifier 326 also has power supply filtering capacitors 396 and a ferrite bead 398.

The voltage limiting amplifier 326 is configured with a feedback resistor 392 of 604 ohms and a 150 ohm resistor 394 tied to ground and the inverting input to produce a gain of 5.03=(1+604/150). The voltage divider 408 of the limiting amplifier stage includes a 22.1 ohm resistor 410 and another 22.1 ohm resistor 412 to cut the gain to 2.52=[5.03*22.1/(22.1+22.1)]. The signal passes through another decoupling capacitor 396' prior to entering the analog data input of the transceiver 330.

The low voltage limiting function of the voltage limiting operational amplifier 326 is configured by an 18.22 kilo-ohm resistor 400 tied to the −5 V power supply and a 1 kilo-ohm resistor 402 tied to ground. A low voltage reference input of the operational amplifier 326 is tied between the resistor 400 and resistor 402 to set the low voltage limit to −0.26 V=[−5V*1000/(1000+18,220)].

The high voltage limiting function of the voltage limiting operational amplifier 326 is configured by an 18.22 kilo-ohm resistor 404 tied to the +5 V power supply and a 1 kilo-ohm resistor 406 tied to ground. A high voltage reference input of the operational amplifier 326 is tied between the resistor 404 and resistor 406 to set the high voltage limit to +0.26 V=[+5V*1000/(1000+18,220)].

Figure 15:
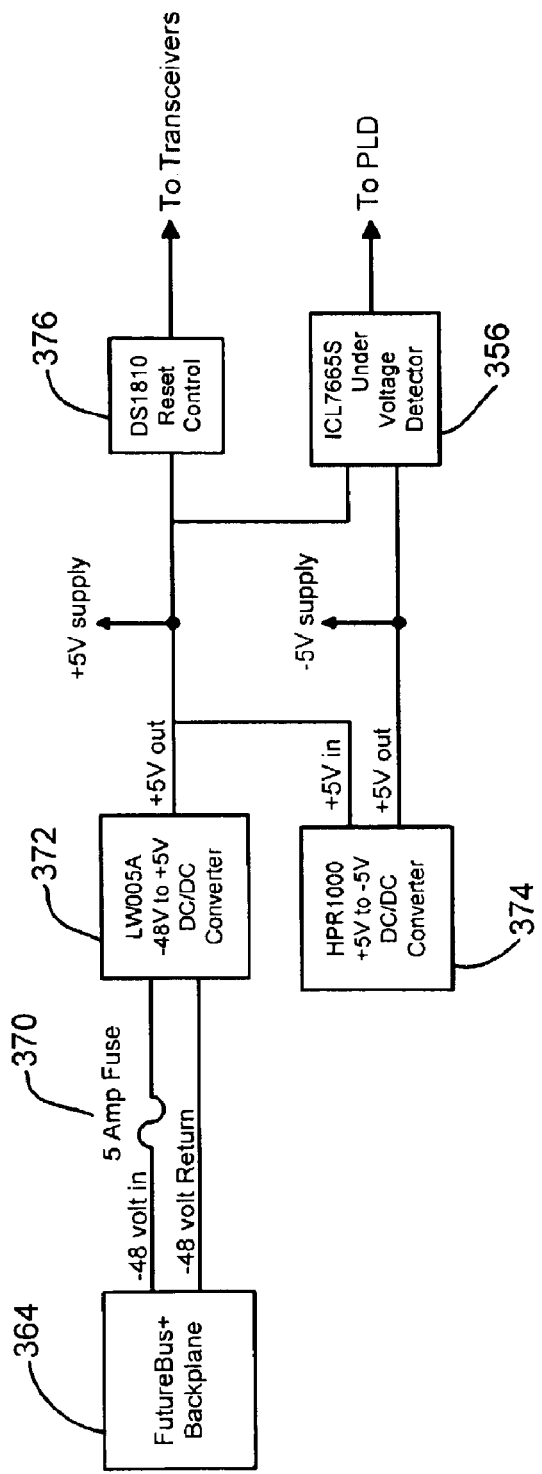
FIG. 15 is a block-diagram of the power supply of the bridging repeater circuit.

FIG. 15 shows a block diagram of the power supply 368 of the bridging repeater circuit. −48V is received from a pin of the backplane connector 364 and it delivered through a 0.5 amp fuse 370 to a DC/DC converter 372, such as model LW005A. This DC/DC converter converts the −48 V to +5 V and supplies the +5 volt to the appropriate circuitry including the amplifiers 322, 326 and transceiver 330. This DC/DC converter 372 also provides +5 V to a second DC/DC converter 374, such as model HPR1000. This DC/DC converter converts the +5 V to −5 V and supplies the −5 V to the appropriate circuitry.

The +5 V supply is also connected to a reset control device 376, such as model DS1810. The reset control 376 sends a reset signal to the transceiver 330 during power-up and during low voltage conditions. If the +5 V dips below a threshold, such as 4.75 V, then the reset control 376 holds the reset line low until the voltage rises above the threshold and for an additional 150 milliseconds thereafter to reset both the transmitter and receiver portions of transceiver 330.

The +5V and −5 V supplies are also connected to the under-voltage detector 356 that connects to the PLD 358. The under-voltage detector, such as model ICL7665S, triggers an output signal when the received voltage dips below 4.45 V to indicate to the PLD 358 that the voltage is beyond the acceptable range.

Figure 16:
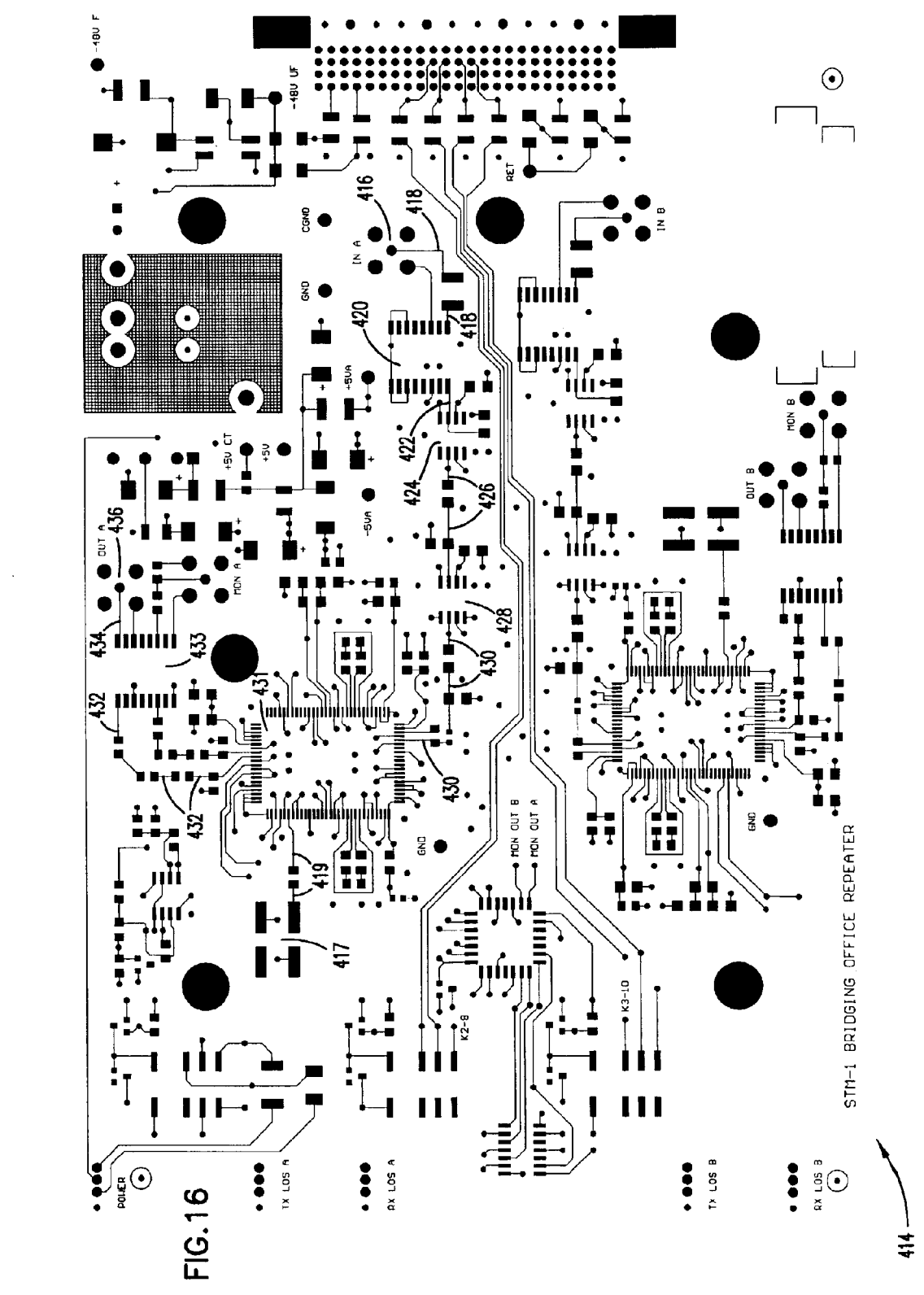

FIG. 16 shows a top layer 414 of the printed circuit board, such as printed circuit board 279 of FIG. 9C, for supporting the bridging repeater circuitry 312. The printed circuit board 279 has signal traces that lead from the input jack area 416 to the output jack area 436 of channel A. A signal trace 418 carries the signal from the input jack area 436 to the isolation transformer area 420. A signal trace 422 carries the signal from the isolation transformer area 420 to the first amplifier area 424. A signal trace 426 carries the signal from the first amplifier area 424 to the second amplifier area 428. A signal trace 430 carries the signal from the second amplifier area 428 to the transceiver area 431 to complete the input circuit.

As shown, the signal trace 422 between the transformer area 420 and first amplifier area 424 and signal trace 426 between the first amplifier area 424 and the second amplifier area 428 are individually linear. Furthermore, both of these traces 422, and 428 are linear with respect to one another.

A signal trace 432 carries the signal from the transceiver area 431 to the second isolation transformer area 433. A signal trace 434 carries the signal from the second isolation transformer area 433 to the output jack area 436 to complete the output circuit.

As can be seen the signal traces from input area 416 to output area 436 all lie within the top layer and are therefore disposed within a single spatial plane. Furthermore, the signal traces leading from the input area 416 to output area 436 have a constant width. No test vias or other trace deformations are present to disrupt the constant signal trace width. Placing the signals within the single spatial plane and maintaining the trace width from input to output improves the noise rejection of the bridging repeater circuit.

For maximizing signal integrity, the length of each continuous piece of signal trace should be maintained at 0.25 inches or below, especially for high data rates such as STM-1. Furthermore, potential interference sources such as the crystal oscillator 354 located in oscillator area 417 should be positioned closely to the transceiver portion 431 to minimize the length of the oscillator trace 419. For maximizing signal integrity, the length of the oscillator trace 419 should be maintained at 0.8 inches or less.

Figure 17:
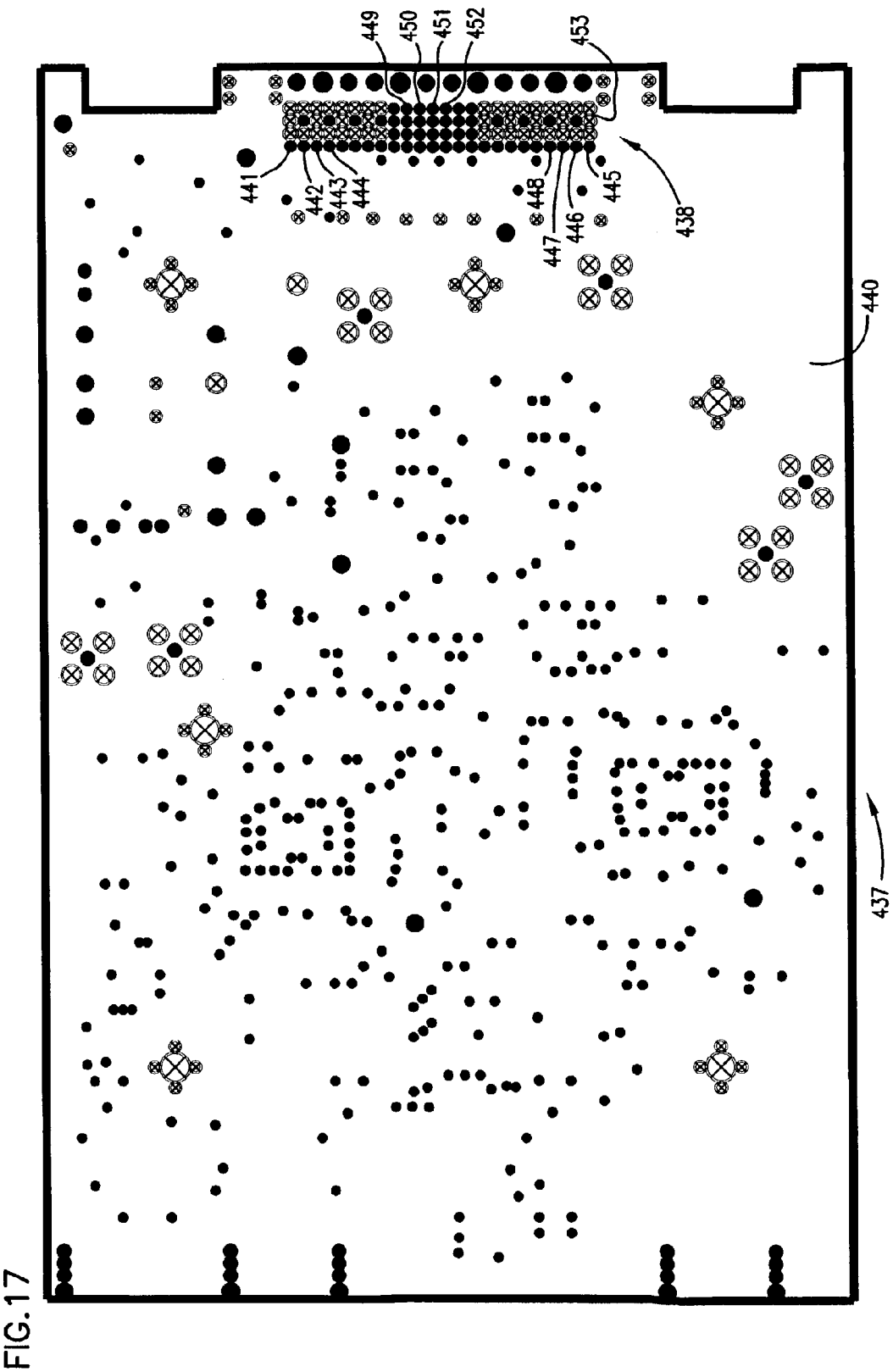
FIG. 17 is an internal layer view of the printed circuit board showing the ground plane configuration of connector pins.

FIG. 17 shows another layer of the printed circuit board supporting the bridging repeater circuit. This ground layer 437 includes a continuous copper sheet 440 and shielding pin connections from the pin connector layout 438. The continuous copper sheet 440 is tied to the shielding pins which may be tied to chassis ground, such as through the connector 166 that is tied to the ground wire 196 through the ground conductor 164' in chassis 100.

The pins that are for shielding purposes, including pins shown with connections to the ground plane 440 such as pin 453, surround the pins that carry −48V power and the −48 V return including pins 441, 442, 443, 444, 445, 446, 447, and 448 as well as pins carrying alarm relays such as pins 449, 450, 451, and 452. These shielding pins such as pin 453 in conjunction with the continuous copper sheet 440 establish a ground plane that may permeate any gaps between the opening 258 and connector 260 in the back surface 256 of module 234. As shown, 12 out of 55 pins carry power or alarm relays leaving 78% of the pins as shields.

Figure 18:
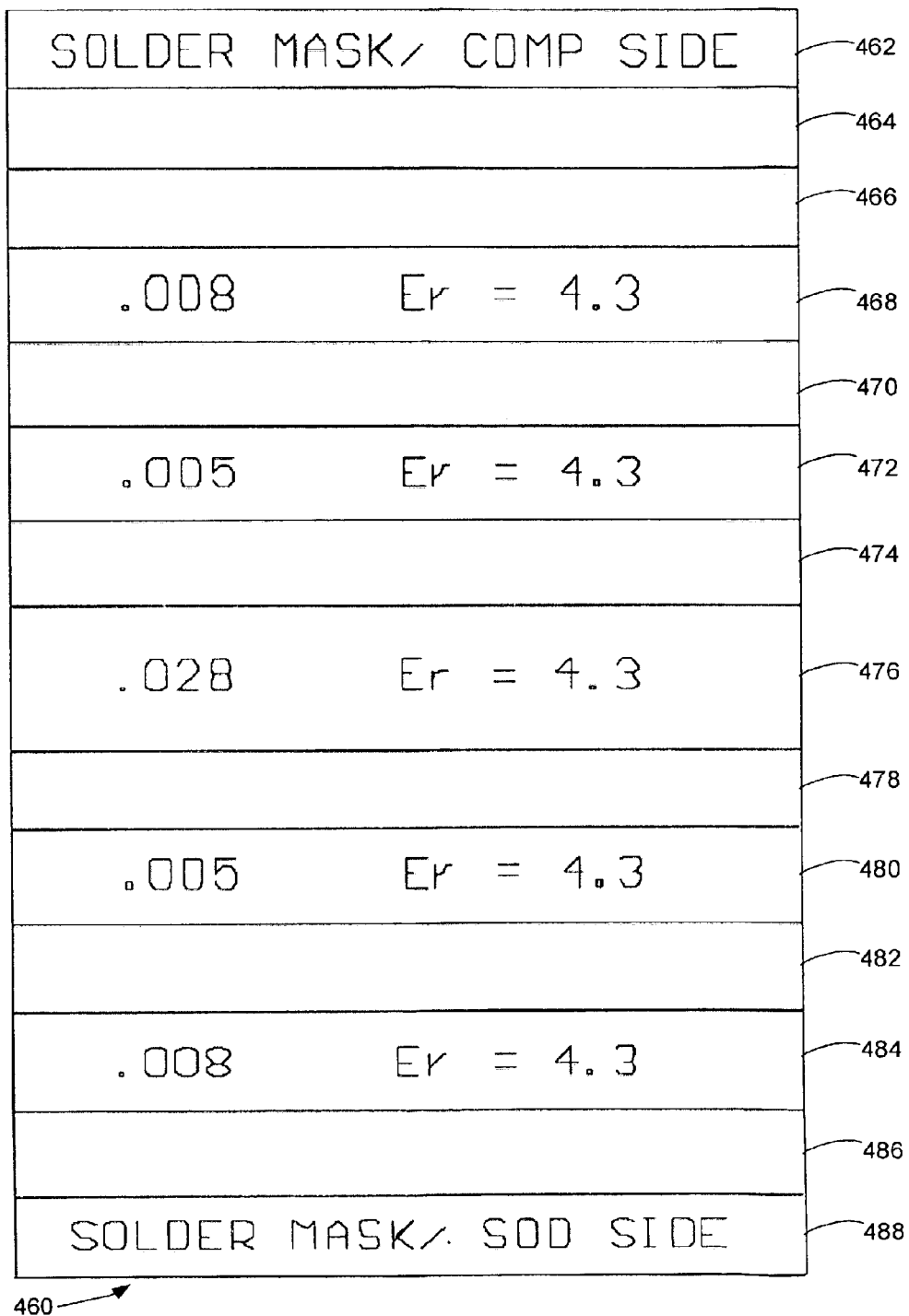
FIG. 18 is a cross-sectional view of the printed circuit board illustrating the six individual conductive layers separated by dielectrics.

FIG. 18 shows a cross-section of the printed circuit board 460. The printed circuit board 460 has several layers including conduction layers and dielectric layers. A solder mask 462 is applied to the top-most layer 464, and another solder mask 488 is applied to the bottom-most layer 486. A first conductive layer is made of two individual layers, a first layer 466 of copper and a plating layer 464 made of tin.

Beneath the first layer of copper 466 lies a resin dielectric layer 468. Then a second conductive layer 470 of copper is included. Beneath the conductive layer 470 lies a dielectric layer 472. Beneath the dielectric layer 472 lies a third conductive layer 474. Beneath the conductive layer 474 lies a dielectric layer 476. Beneath the dielectric layer 476 lies a fourth conductive layer 478. Beneath the fourth conductive layer 478 lies a dielectric layer 480. Beneath the dielectric layer 480 lies a fifth conductive layer 482. Beneath the conductive layer 482 lies a dielectric layer 484. The sixth and bottom-most conductive layer lies beneath the dielectric layer 484 and includes two individual layers, a copper layer 486 and a plating layer 488 that includes the solder mask.

The dielectric layer 476 has the greatest thickness, such as 28 mils followed by the two outer-most dielectric layers 468 and 484 having a thickness such as 8 mils. The intermediate dielectric layers 472 and 480 have the least thickness, such as 5 mils. The dielectric constant for these layers is about 4.3. The outer-most copper layers 466 and 486 contain about 0.5 oz of copper. The other copper layers 470, 474, 478, and 482 contain about 1 oz of copper.

The conductive and dielectric layers are arranged such that the signals are on the outer conductive layer 464 to eliminate vias that add capacitance. The power and chassis ground are layers 474 and 478, respectively, and are separated by the thickest dielectric 476 to limit the chassis noise that is introduced into the power lines. Conductive layer 470 is copper ground plane establishing a logic ground. Conductive layer 482 is another logic ground layer, and layer 486 carries power supply bypass lines including lines to resistors, capacitors, etc.

While the invention has been particularly shown and described with reference to preferred embodiments thereof, it will be understood by those skilled in the art that various other changes in the form and details may be made therein without departing from the spirit and scope of the invention.

What is claimed is:

1. A telecommunications chassis, comprising:
    a shielding chamber having a first and second horizontal surface and a first and second vertical surface, the first and second vertical surfaces being disposed between the first and second horizontal surfaces, wherein the first and second horizontal surfaces and the first and second vertical surfaces are made of metal and are conductively connected;
    a vertical backplane having connectors for interfacing with telecommunications modules, the vertical backplane being disposed between the first and second horizontal surfaces and the first and second vertical surfaces, the vertical backplane establishing contact with the first and second horizontal surfaces and the first and second vertical surfaces, the vertical backplane having a ground conductor electrically connected to the connectors;
    an outer housing encompassing the shielding chamber and the vertical backplane and having an open side for receiving telecommunications modules, and the outer housing having a first cover surface that is substantially parallel to but within a different spatial plane from the first horizontal surface and having a second cover surface that is substantially parallel to but within a different spatial plane from the vertical backplane, wherein spacing between the first cover surface and the first horizontal surface and spacing between the second cover surface and the vertical backplane form an airspace; and
    a chassis ground conductor electrically connected to the shielding chamber and the ground conductor of the vertical backplane.

2. The telecommunications chassis of claim 1, wherein the outer housing further includes a third cover surface that is substantially parallel to but within a different spatial plane from the second horizontal surface, the third cover surface having a plurality of holes adjacent to the airspace.

3. The telecommunications chassis of claim 1, wherein the second cover surface has a plurality of holes adjacent to the airspace.

4. The telecommunications chassis of claim 1, further comprising a faceplate substantially parallel to but within a different spatial plane from the vertical backplane, the faceplate being disposed within the open side of the outer housing, the faceplate for contacting telecommunications modules installed in the chassis, the faceplate having an aperture for receiving telecommunications modules.

5. The telecommunications chassis of claim 1, further comprising a housing door hinged to the outer housing at the open side.

6. The telecommunications chassis of claim 1, further comprising a handle rotatably mounted to the outer housing.

7. The telecommunications chassis of claim 1, wherein the first and second horizontal surfaces have longitudinal slots for guiding and receiving telecommunications modules.

8. The telecommunications chassis of claim 4, wherein the first and second horizontal surfaces have longitudinal slots for guiding and receiving telecommunications modules, and the faceplate has notches that align with the slots.

9. The telecommunications chassis of claim 1, wherein the first and second horizontal surfaces have a plurality of holes.

10. The telecommunications chassis of claim 1, further comprising a power supply mounted to the second cover surface and disposed within the airspace.

11. The telecommunications chassis of claim 1, wherein the outer housing is made of metal and the chassis ground conductor is conductively connected to the outer housing.

12. The telecommunications chassis of claim 1, further comprising a plurality of repeater modules disposed within the shielding chamber and interfaced with the vertical backplane, the repeater modules having circuitry enclosed within a shell, the shell having a first shell surface for engaging the first horizontal surface and a second shell surface for engaging the second horizontal surface.

13. The telecommunications chassis of claim 12, wherein the circuitry receives a monitor signal, amplifies the monitor signal to generate an amplified monitor signal, recovers data and clock information from the amplified monitor signal, and produces an output signal repeating the recovered data and clock information, and wherein the monitor signal and the output signal have data rates greater than about 52 megabits per second.

14. The telecommunications chassis of claim 1, wherein the top and bottom horizontal surfaces have a zinc chromate plating.

* * * * *